US011857486B2

(12) United States Patent
Lurie et al.

(10) Patent No.: US 11,857,486 B2
(45) **Date of Patent: *Jan. 2, 2024**

(54) SYSTEMS AND METHODS FOR HEAD UP CARDIOPULMONARY RESUSCITATION

(71) Applicant: Keith G. Lurie, Minneapolis, MN (US)

(72) Inventors: Keith G. Lurie, Minneapolis, MN (US); Kanchana Sanjaya Gunesekera Karunaratne, Escondido, CA (US); Joseph John Manno, La Jolla, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,784

(22) Filed: Jan. 30, 2023

(65) Prior Publication Data

US 2023/0165750 A1 Jun. 1, 2023

Related U.S. Application Data

(63) Continuation of application No. 17/392,103, filed on Aug. 2, 2021, now Pat. No. 11,712,398, which is a (Continued)

(51) Int. Cl.
*A61H 31/00* (2006.01)
*A61G 13/12* (2006.01)

(52) U.S. Cl.
CPC ......... *A61H 31/004* (2013.01); *A61G 13/122* (2013.01); *A61G 13/129* (2013.01); (Continued)

(58) Field of Classification Search
CPC . A61M 16/0048; A61H 31/00; A61H 31/008; A61H 31/004–007; A61H 31/02; (Continued)

(56) References Cited

U.S. PATENT DOCUMENTS

| | | | |
|---|---|---|---|
| 1,995,583 | A | 3/1935 | Sanderson |
| 2,566,351 | A | 9/1951 | Meuler |

(Continued)

FOREIGN PATENT DOCUMENTS

| | | | |
|---|---|---|---|
| AU | 2016337605 | B2 | 7/2021 |
| CA | 3002244 | A1 | 4/2017 |

(Continued)

OTHER PUBLICATIONS

U.S. Appl. No. 17/392,103, Notice of Allowance, dated Mar. 15, 2023, 8 pages.

(Continued)

*Primary Examiner* — LaToya M Louis
(74) *Attorney, Agent, or Firm* — Kilpatrick Townsend & Stockton LLP

(57) ABSTRACT

A method for performing cardiopulmonary resuscitation (CPR) includes elevating the heart of an individual to a first height relative to a lower body of the individual. The lower body may be in a substantially horizontal plane. The method may also include elevating the head of the individual to a second height relative to the lower body of the individual. The second height may be greater than the first height. The method may further include performing one or more of a type of CPR or a type of intrathoracic pressure regulation while elevating the heart and the head. The first height and the second height may be determined based on one or both of the type of CPR or the type of intrathoracic pressure regulation.

19 Claims, 30 Drawing Sheets

Related U.S. Application Data continuation of application No. 15/652,023, filed on Jul. 17, 2017, now Pat. No. 11,077,016, which is a continuation of application No. 14/935,262, filed on Nov. 6, 2015, now Pat. No. 9,707,152, which is a continuation-in-part of application No. 14/677,562, filed on Apr. 2, 2015, now Pat. No. 10,092,481, which is a continuation of application No. 14/626,770, filed on Feb. 19, 2015, now Pat. No. 10,245,209.

(60) Provisional application No. 62/242,655, filed on Oct. 16, 2015, provisional application No. 62/087,717, filed on Dec. 4, 2014, provisional application No. 62/000,836, filed on May 20, 2014, provisional application No. 61/941,670, filed on Feb. 19, 2014.

(52) U.S. Cl.
CPC ..... *A61G 13/1215* (2013.01); *A61G 13/1225* (2013.01); *A61G 13/1255* (2013.01); *A61G 13/1285* (2013.01); *A61H 31/005* (2013.01); *A61H 31/006* (2013.01); *A61H 31/007* (2013.01); *A61H 31/008* (2013.01); *A61H 2201/0192* (2013.01); *A61H 2201/1609* (2013.01); *A61H 2201/1619* (2013.01); *A61H 2201/1623* (2013.01); *A61H 2201/1676* (2013.01); *A61H 2201/5007* (2013.01); *A61H 2201/5071* (2013.01); *A61H 2201/5097* (2013.01); *A61H 2230/208* (2013.01); *A61H 2230/255* (2013.01); *A61H 2230/305* (2013.01)

(58) Field of Classification Search
CPC ........ A61H 2031/001; A61H 2031/002; A61H 2031/003; A61H 2031/025
See application file for complete search history.

(56) References Cited

U.S. PATENT DOCUMENTS 2,683,452 A 7/1954 McCavic
3,461,858 A 8/1969 Michelson
3,509,899 A 5/1970 Hewson
3,804,082 A 4/1974 Tarjan et al.
3,866,604 A 2/1975 Curless et al.
3,870,038 A 3/1975 Arblaster
3,931,653 A 1/1976 Bien
3,985,126 A 10/1976 Barkalow
4,060,079 A 11/1977 Reinhold, Jr.
4,095,590 A 6/1978 Harrigan
4,168,554 A 9/1979 Hindes
4,194,732 A 3/1980 Liebman
4,266,759 A 5/1981 Liebman
4,362,336 A 12/1982 Zapf et al.
4,534,075 A 8/1985 Schnitzler
4,915,095 A 4/1990 Chun
5,048,136 A 9/1991 Popitz
5,316,907 A 5/1994 Lurie et al.
5,399,148 A 3/1995 Waide et al.
5,400,448 A 3/1995 Zwickey
5,423,772 A 6/1995 Lurie et al.
5,454,779 A 10/1995 Lurie et al.
5,487,722 A 1/1996 Weaver, II et al.
5,490,820 A 2/1996 Schock et al.
5,538,002 A 7/1996 Boussignac et al.
5,549,581 A 8/1996 Lurie et al.
5,551,420 A 9/1996 Lurie et al.
5,588,422 A 12/1996 Lurie et al.
5,618,665 A 4/1997 Lurie et al.
5,634,222 A 6/1997 Zwickey
5,643,231 A 7/1997 Lurie et al.
5,645,522 A 7/1997 Lurie et al.
5,692,498 A 12/1997 Lurie et al.
5,722,963 A 3/1998 Lurie et al.
5,730,122 A 3/1998 Lurie
5,730,136 A 3/1998 Laufer et al.
5,827,893 A 10/1998 Lurie et al.
5,919,210 A 7/1999 Lurie et al.
5,984,909 A 11/1999 Lurie et al.
6,001,085 A 12/1999 Lurie et al.
6,029,667 A 2/2000 Lurie
6,062,219 A 5/2000 Lurie et al.
6,078,834 A 6/2000 Lurie et al.
6,116,288 A 9/2000 Yamamura
6,142,962 A 11/2000 Mollenauer et al.
6,155,257 A 12/2000 Lurie et al.
6,224,562 B1 5/2001 Lurie et al.
6,234,916 B1 5/2001 Carusillo et al.
6,234,985 B1 5/2001 Lurie et al.
6,277,107 B1 8/2001 Lurie et al.
6,312,399 B1 11/2001 Lurie et al.
6,357,065 B1 3/2002 Adams
6,371,119 B1 4/2002 Zadini et al.
6,425,393 B1 7/2002 Lurie et al.
6,446,288 B1 9/2002 Pi
6,446,962 B1 9/2002 Taffertshofer
6,459,933 B1 10/2002 Lurie et al.
6,463,327 B1 10/2002 Lurie et al.
6,486,206 B1 11/2002 Lurie
6,526,973 B1 3/2003 Lurie et al.
6,587,726 B2 7/2003 Lurie et al.
6,604,523 B2 8/2003 Lurie et al.
6,656,166 B2 12/2003 Lurie et al.
6,751,818 B2 6/2004 Troop
6,776,156 B2 8/2004 Lurie et al.
6,810,257 B1 10/2004 Amin
6,863,656 B2 3/2005 Lurie
6,935,336 B2 8/2005 Lurie et al.
6,938,618 B2 9/2005 Lurie et al.
6,986,349 B2 1/2006 Lurie
7,044,128 B2 5/2006 Lurie et al.
7,056,296 B2 6/2006 Sherman et al.
7,060,041 B1 6/2006 Weil et al.
7,082,945 B2 8/2006 Lurie
7,174,891 B2 2/2007 Lurie et al.
7,185,649 B2 3/2007 Lurie
7,195,012 B2 3/2007 Lurie
7,195,013 B2 3/2007 Lurie
7,204,251 B2 4/2007 Lurie
7,210,480 B2 5/2007 Lurie et al.
7,275,542 B2 10/2007 Lurie et al.
7,296,312 B2 11/2007 Menkedick et al.
7,311,668 B2 12/2007 Lurie
7,347,832 B2 3/2008 Jensen et al.
7,410,649 B2 8/2008 Yoshimi et al.
7,569,021 B2 8/2009 Sebelius et al.
7,682,312 B2 3/2010 Lurie
7,766,011 B2 8/2010 Lurie
7,836,881 B2 11/2010 Lurie et al.
7,899,526 B2 3/2011 Benditt et al.
8,011,367 B2 9/2011 Lurie et al.
8,108,204 B2 1/2012 Gabrilovich et al.
8,151,790 B2 4/2012 Lurie et al.
8,210,176 B2 7/2012 Metzger et al.
8,291,534 B2 10/2012 Karlson
8,336,142 B1 12/2012 See et al.
8,408,204 B2 4/2013 Lurie
8,690,807 B2 4/2014 Hiebert
8,702,633 B2 4/2014 Voss et al.
8,752,220 B2 6/2014 Soderberg et al.
8,755,902 B2 6/2014 Lurie et al.
8,763,610 B2 7/2014 Schmidt
8,967,144 B2 3/2015 Lurie et al.
9,107,800 B2 8/2015 Sebelius et al.
9,707,152 B2 7/2017 Lurie et al.
9,750,661 B2 9/2017 Lurie et al.
9,801,782 B2 10/2017 Lurie et al.
10,092,481 B2 10/2018 Lurie
10,245,209 B2 4/2019 Lurie
10,350,137 B2 7/2019 Lurie et al.
10,406,068 B2 9/2019 Lurie et al.
10,406,069 B2 9/2019 Lurie et al.
10,667,987 B2 6/2020 Lurie

(56) References Cited

U.S. PATENT DOCUMENTS

| | | | |
|---|---|---|---|
| 11,020,314 | B2 | 6/2021 | Lurie |
| 11,077,016 | B2 | 8/2021 | Lurie et al. |
| 11,096,861 | B2 | 8/2021 | Lurie |
| 11,246,794 | B2 | 2/2022 | Lurie |
| 11,259,988 | B2 | 3/2022 | Lurie et al. |
| 11,395,786 | B2 | 7/2022 | Lurie et al. |
| 2002/0002347 | A1 | 1/2002 | Kelly et al. |
| 2002/0069878 | A1 | 6/2002 | Lurie et al. |
| 2002/0170562 | A1 | 11/2002 | Lurie et al. |
| 2003/0062040 | A1 | 4/2003 | Lurie et al. |
| 2003/0181834 | A1 | 9/2003 | Sebelius et al. |
| 2004/0016428 | A9 | 1/2004 | Lurie |
| 2004/0058305 | A1 | 3/2004 | Lurie et al. |
| 2004/0116840 | A1 | 6/2004 | Cantrell et al. |
| 2004/0200474 | A1 | 10/2004 | Lurie |
| 2004/0211415 | A1 | 10/2004 | Lurie |
| 2004/0211416 | A1 | 10/2004 | Lurie |
| 2004/0211417 | A1 | 10/2004 | Lurie |
| 2004/0231664 | A1 | 11/2004 | Lurie et al. |
| 2005/0165334 | A1 | 7/2005 | Lurie |
| 2005/0199237 | A1 | 9/2005 | Lurie |
| 2005/0217677 | A1 | 10/2005 | Lurie et al. |
| 2005/0267381 | A1 | 12/2005 | Benditt et al. |
| 2006/0162077 | A1 | 7/2006 | McDaniel et al. |
| 2006/0258964 | A1 | 11/2006 | Biondo et al. |
| 2006/0277683 | A1 | 12/2006 | Lamire et al. |
| 2007/0021683 | A1 | 1/2007 | Benditt et al. |
| 2007/0157385 | A1 | 7/2007 | Lemire et al. |
| 2007/0277826 | A1 | 12/2007 | Lurie |
| 2008/0045867 | A1 | 2/2008 | Jensen et al. |
| 2008/0047555 | A1 | 2/2008 | Lurie et al. |
| 2008/0255482 | A1 | 10/2008 | Lurie |
| 2009/0062701 | A1 | 3/2009 | Yannopoulos et al. |
| 2009/0277447 | A1 | 11/2009 | Voss et al. |
| 2009/0308400 | A1 | 12/2009 | Wilson et al. |
| 2010/0031961 | A1 | 2/2010 | Schmidt |
| 2010/0179442 | A1 | 7/2010 | Lurie |
| 2010/0319691 | A1 | 12/2010 | Lurie et al. |
| 2011/0030141 | A1 | 2/2011 | Soderberg et al. |
| 2011/0047709 | A1 | 3/2011 | Tarsaud et al. |
| 2011/0083271 | A1 | 4/2011 | Bhai |
| 2011/0098612 | A1 | 4/2011 | Lurie |
| 2011/0132377 | A1 | 6/2011 | Phillips |
| 2011/0160782 | A1 | 6/2011 | Lurie et al. |
| 2011/0201979 | A1 | 8/2011 | Voss et al. |
| 2011/0297147 | A1 | 12/2011 | Lick et al. |
| 2012/0016179 | A1 | 1/2012 | Paradis et al. |
| 2012/0042881 | A1 | 2/2012 | Paulussen et al. |
| 2012/0109027 | A1 | 5/2012 | Gozelski, Jr. et al. |
| 2012/0203147 | A1 | 8/2012 | Lurie et al. |
| 2012/0260428 | A1 | 10/2012 | Franklin |
| 2012/0266383 | A1 | 10/2012 | Pi |
| 2012/0330199 | A1 | 12/2012 | Lurie et al. |
| 2012/0330200 | A1 | 12/2012 | Voss et al. |
| 2013/0231593 | A1 | 9/2013 | Yannopoulos et al. |
| 2014/0005566 | A1 | 1/2014 | Homuth et al. |
| 2014/0048061 | A1 | 2/2014 | Yannopoulos et al. |
| 2014/0082842 | A1 | 3/2014 | Jackson |
| 2014/0171839 | A1 | 6/2014 | Fleming |
| 2014/0276269 | A1 | 9/2014 | Illindala |
| 2014/0324763 | A1 | 10/2014 | Lurie et al. |
| 2014/0363391 | A1 | 12/2014 | Yannopoulos et al. |
| 2015/0057580 | A1 | 2/2015 | Illindala |
| 2015/0231026 | A1 | 8/2015 | Lurie |
| 2015/0231027 | A1 | 8/2015 | Lurie |
| 2016/0058660 | A1 | 3/2016 | Lurie et al. |
| 2016/0128899 | A1 | 5/2016 | Lurie et al. |
| 2016/0228326 | A1 | 8/2016 | Lurie et al. |
| 2016/0338904 | A1 | 11/2016 | Lurie et al. |
| 2016/0354271 | A1 | 12/2016 | Ladozhskaya-Gapeenko et al. |
| 2017/0119622 | A1 | 5/2017 | Lurie et al. |
| 2017/0258677 | A1 | 9/2017 | Lurie et al. |
| 2018/0000687 | A1 | 1/2018 | Lurie et al. |
| 2018/0008510 | A1 | 1/2018 | Lurie et al. |
| 2018/0125749 | A1 | 5/2018 | Lurie et al. |
| 2019/0175444 | A9 | 6/2019 | Lurie et al. |
| 2019/0269574 | A1 | 9/2019 | Lurie |
| 2019/0282441 | A1 | 9/2019 | Lurie |
| 2021/0000685 | A1 | 1/2021 | Lurie |
| 2021/0322264 | A1 | 10/2021 | Lurie |
| 2021/0361526 | A1 | 11/2021 | Lurie et al. |
| 2022/0079839 | A1 | 3/2022 | Lurie |
| 2022/0110826 | A1 | 4/2022 | Lurie |
| 2022/0265509 | A1 | 8/2022 | Lurie et al. |

FOREIGN PATENT DOCUMENTS

| | | | |
|---|---|---|---|
| CN | 107343847 | A | 11/2017 |
| EP | 2289477 | A1 | 3/2011 |
| EP | 2308440 | A2 | 4/2011 |
| EP | 3107516 | B1 | 12/2016 |
| EP | 3362028 | A1 | 8/2018 |
| JP | 6890130 | B2 | 5/2021 |
| TW | 200934469 | A | 8/2009 |
| WO | 0128484 | A1 | 4/2001 |
| WO | 2015026460 | A1 | 2/2015 |
| WO | 2015127102 | A2 | 8/2015 |
| WO | 2015127102 | A3 | 11/2015 |
| WO | 2017066770 | A1 | 4/2017 |
| WO | 2019125682 | A1 | 6/2019 |

OTHER PUBLICATIONS

U.S. Appl. No. 17/559,637, Non-Final Office Action, dated Mar. 30, 2023, 10 pages.

Author Unknown, "Lucas 3 Chest Compression System", Retrieved from https://www.physiocontrol.com/WCProductDetails.aspx?id=2147484788&langtype=5129, Accessed from Internet on Aug. 5, 2021, pp. 1-2.

Author Unknown, "Lucas CPR", Chest Compression System, Retrieved from http://www.lucas-cpr.com/en/lucas_cpr/lucas_cpr, Accessed from Internet on Sep. 7, 2018, 16 pages.

Author Unknown, "The System for High-Quality CPR", Retrieved from https://www.zoll.com/medical-technology/cpr, Accessed from Internet on Sep. 14, 2018, 2 pages.

U.S. Appl. No. 14/626,770, "Corrected Notice of Allowability", dated Jan. 4, 2019, 2 pages.

U.S. Appl. No. 14/626,770, Non-Final Office Action, dated Sep. 27, 2017, 10 pages.

U.S. Appl. No. 14/626,770, Non-Final Office Action, dated Oct. 16, 2017, 11 pages.

U.S. Appl. No. 14/626,770, Non-Final Office Action, dated Jun. 7, 2018, 9 pages.

U.S. Appl. No. 14/626,770, Notice of Allowance, dated Dec. 14, 2018, 5 pages.

U.S. Appl. No. 14/677,562, Advisory Action, dated Jul. 11, 2016, 4 pages.

U.S. Appl. No. 14/677,562, "Corrected Notice of Allowability", dated Sep. 4, 2018, 2 pages.

U.S. Appl. No. 14/677,562, Final Office Action, dated Jan. 9, 2017, 13 pages.

U.S. Appl. No. 14/677,562, Final Office Action, dated Jan. 23, 2018, 9 pages.

U.S. Appl. No. 14/677,562, Final Office Action, dated May 27, 2016, 9 pages.

U.S. Appl. No. 14/677,562, Non-Final Office Action, dated Sep. 24, 2015, 12 pages.

U.S. Appl. No. 14/677,562, Non-Final Office Action, dated Sep. 6, 2016, 12 pages.

U.S. Appl. No. 14/677,562, Non-Final Office Action, dated Jan. 6, 2016, 9 pages.

U.S. Appl. No. 14/677,562, Non-Final Office Action, dated Jun. 13, 2017, 9 pages.

U.S. Appl. No. 14/677,562, Notice of Allowance, dated Jul. 23, 2018, 9 pages.

U.S. Appl. No. 14/935,262, "Corrected Notice of Allowability", dated May 4, 2017, 6 pages.

U.S. Appl. No. 14/935,262, Non-Final Office Action, dated Sep. 9, 2016, 13 pages.

(56) References Cited

OTHER PUBLICATIONS

U.S. Appl. No. 14/935,262, Notice of Allowance, dated Jan. 4, 2017, 10 pages.
U.S. Appl. No. 14/935,262, "Restriction Requirement", dated Jun. 2, 2016, 7 pages.
U.S. Appl. No. 14/996,147, Non-Final Office Action, dated Aug. 26, 2016, 15 pages.
U.S. Appl. No. 14/996,147, "Notice of Abandonment", dated May 8, 2017, 1 page.
U.S. Appl. No. 14/996,147, Notice of Allowance, dated Jan. 18, 2017, 12 pages.
U.S. Appl. No. 14/996,147, "Restriction Requirement", dated Jul. 18, 2016, 7 pages.
U.S. Appl. No. 15/133,967, Advisory Action, dated Jun. 7, 2017, 3 pages.
U.S. Appl. No. 15/133,967, Final Office Action, dated Mar. 13, 2017, 26 pages.
U.S. Appl. No. 15/133,967, Non-Final Office Action, dated Oct. 11, 2016, 21 pages.
U.S. Appl. No. 15/133,967, Notice of Allowance, dated Jul. 5, 2017, 10 pages.
U.S. Appl. No. 15/133,967, "Notice of Publication", dated Aug. 11, 2016, 1 page.
U.S. Appl. No. 15/160,492, Advisory Action, dated Dec. 3, 2018, 3 pages.
U.S. Appl. No. 15/160,492, Advisory Action, dated Oct. 3, 2019, 4 pages.
U.S. Appl. No. 15/160,492, Final Office Action, dated Aug. 9, 2018, 15 pages.
U.S. Appl. No. 15/160,492, Final Office Action, dated Jul. 11, 2019, 15 pages.
U.S. Appl. No. 15/160,492, Non-Final Office Action, dated Jan. 11, 2018, 15 pages.
U.S. Appl. No. 15/160,492, Non-Final Office Action, dated Dec. 13, 2018, 17 pages.
U.S. Appl. No. 15/160,492, Non-Final Office Action, dated Nov. 1, 2019, 19 pages.
U.S. Appl. No. 15/160,492, Notice of Allowance, dated Oct. 20, 2021, 8 pages.
U.S. Appl. No. 15/285,063, Advisory Action, dated Dec. 20, 2018, 3 pages.
U.S. Appl. No. 15/285,063, Final Office Action, dated May 11, 2018, 19 pages.
U.S. Appl. No. 15/285,063, Non-Final Office Action, dated Jan. 12, 2018, 17 pages.
U.S. Appl. No. 15/285,063, Non-Final Office Action, dated Jan. 28, 2019, 18 pages.
U.S. Appl. No. 15/285,063, Notice of Allowance, dated Jul. 17, 2019, 5 pages.
U.S. Appl. No. 15/601,494, "Corrected Notice of Allowability", dated May 30, 2019, 2 pages.
U.S. Appl. No. 15/601,494, Notice of Allowance, dated Apr. 10, 2019, 10 pages.
U.S. Appl. No. 15/652,023, Advisory Action, dated Mar. 16, 2020, 3 pages.
U.S. Appl. No. 15/652,023, Advisory Action, dated Feb. 24, 2021, 4 pages.
U.S. Appl. No. 15/652,023, Final Office Action, dated Jan. 9, 2020, 14 pages.
U.S. Appl. No. 15/652,023, Final Office Action, dated Nov. 17, 2020, 18 pages.
U.S. Appl. No. 15/652,023, Non-Final Office Action, dated Jun. 28, 2019, 13 pages.
U.S. Appl. No. 15/652,023, Non-Final Office Action, dated May 1, 2020, 14 pages.
U.S. Appl. No. 15/652,023, Notice of Allowance, dated Apr. 2, 2021, 8 pages.
U.S. Appl. No. 15/689,670, Final Office Action, dated Apr. 16, 2020, 16 pages.
U.S. Appl. No. 15/689,670, Non-Final Office Action, dated Oct. 4, 2019, 10 pages.
U.S. Appl. No. 15/689,670, Notice of Allowance, dated Mar. 11, 2022, 9 pages.
U.S. Appl. No. 15/796,579, Advisory Action, dated Jun. 24, 2020, 4 pages.
U.S. Appl. No. 15/796,579, Final Office Action, dated Feb. 25, 2021, 15 pages.
U.S. Appl. No. 15/796,579, Final Office Action, dated Apr. 16, 2020, 9 pages.
U.S. Appl. No. 15/796,579, Non-Final Office Action, dated Aug. 6, 2020, 13 pages.
U.S. Appl. No. 15/796,579, Non-Final Office Action, dated Oct. 4, 2019, 9 pages.
U.S. Appl. No. 15/850,827, Notice of Allowance, dated Feb. 3, 2020, 12 pages.
U.S. Appl. No. 15/986,466, First Action Interview Office Action Summary, dated Jan. 7, 2019, 6 pages.
U.S. Appl. No. 15/986,466, First Action Interview Pilot Program Pre-Interview Communication, dated Oct. 17, 2018, 4 pages.
U.S. Appl. No. 15/986,466, Notice of Allowance, dated Jul. 8, 2019, 12 pages.
U.S. Appl. No. 16/058,851, Notice of Allowance, dated Feb. 5, 2021, 21 pages.
U.S. Appl. No. 16/418,902, Notice of Allowance, dated Sep. 23, 2021, 13 pages.
U.S. Appl. No. 16/432,633, Non-Final Office Action, dated Jan. 14, 2021, 7 pages.
U.S. Appl. No. 16/432,633, Notice of Allowance, dated Apr. 21, 2021, 7 pages.
U.S. Appl. No. 17/392,103, Non-Final Office Action, dated Nov. 25, 2022, 12 pages.
Application No. AU2016337605, "First Examination Report", dated Jul. 16, 2020, 5 pages.
Application No. AU2016337605, "Notice of Acceptance", dated Jul. 15, 2021, 3 pages.
Application No. AU2016337605, "Second Examination Report", dated Apr. 23, 2021, 4 pages.
Application No. CA3,002,244, Office Action, dated Dec. 23, 2022, 3 pages.
Debaty, et al., "Tilting for Perfusion: Head-up Position During Cardiopulmonary Resuscitation Improves Brain Flow in a Porcine Model of Cardiac Arrest", Resuscitation, vol. 87, Feb. 2015, pp. 38-43.
Application No. EP15751853.1, Extended European Search Report, dated Oct. 2, 2017, 9 pages.
Application No. EP15751853.1, Notice of Decision to Grant, dated Sep. 8, 2022, 3 pages.
Application No. EP15751853.1, Office Action, dated Nov. 14, 2019, 9 pages.
Application No. EP15751853.1, "Summons to Attend Oral Proceedings", Sep. 27, 2021, 9 pages.
Application No. EP16856418.5, Extended European Search Report, dated Jun. 4, 2019, 8 pages.
Application No. EP16856418.5, Notice of Decision to Grant, dated Jul. 23, 2020, 3 pages.
Application No. EP18891009.5, Extended European Search Report, dated Sep. 1, 2021, 9 pages.
Gocze, et al., "The Effects of the Semirecumbent Position on Hemodynamic Status in Patients on Invasive Mechanical Ventilation: Prospective Randomized Multivariable Analysis", Critical Care, vol. 17, No. 2, Apr. 26, 2013, 9 pages.
Application No. JP2018-539249, Notice of Allowance, dated Apr. 27, 2021, 6 pages.
Application No. JP2018-539249, Office Action, dated Oct. 27, 2020, 13 pages.
Application No. JP2018-539249, Office Action, dated Feb. 24, 2021, 6 pages.
Khandelwal, et al., "Head-Elevated Patient Positioning Decreases Complications of Emergent Tracheal Intubation in the Ward and Intensive Care Unit", Anesthesia & Analgesia, vol. 122, No. 4, Apr. 2016, pp. 1101-1107.

(56) References Cited

OTHER PUBLICATIONS

Lurie, "Mechanical Devices for Cardiopulmonary Resuscitation: An Update", Emergency Medicine Clinics of North America, vol. 20, No. 4, Nov. 2002, pp. 771-784.
Lurie, et al., "The Physiology of Cardiopulmonary Resuscitation", Anesthesia & Analgesia, vol. 122, No. 3, Mar. 2016, pp. 767-783.
Moore, et al., "Head and Thorax Elevation During Active Compression Decompression Cardiopulmonary Resuscitation With an Impedance Threshold Device Improves Cerebral Perfusion in a Swine Model of Prolonged Cardiac Arrest", Resuscitation, Dec. 2017, 1 page.
Application No. PCT/US2015/016651, International Preliminary Report on Patentability, dated Sep. 1, 2016, 11 pages.
Application No. PCT/US2015/016651, International Search Report and Written Opinion, dated Jul. 8, 2015, 14 pages.
Application No. PCT/US2015/016651, "Invitation to Pay Additional Fees and, Where Applicable, Protest Fee", dated Apr. 27, 2015, 3 pages.
Application No. PCT/US2016/057366, International Preliminary Report on Patentability, dated Apr. 26, 2018, 12 pages.
Application No. PCT/US2016/057366, International Search Report and Written Opinion, dated Mar. 13, 2017, 15 pages.
Application No. PCT/US2016/057366, "Invitation to Pay Additional Fees and, Where Applicable, Protest Fee", dated Dec. 12, 2016, 2 pages.
Application No. PCT/US2018/061789, International Preliminary Report on Patentability, dated Jul. 2, 2020, 8 pages.
Application No. PCT/US2018/061789, International Search Report and Written Opinion, dated Feb. 11, 2019, 9 pages.
Ryu, et al., "The Effect of Head Up Cardiopulmonary Resuscitation on Cerebral and Systemic Hemodynamics", Resuscitation, vol. 102, May 2016, pp. 29-34.
Song, et al., "Effectiveness of Chest Compression Feedback During Cardiopulmonary Resuscitation in Lateral Tilted and Semirecumbent Positions; A Randomised Controlled Stimulation Study", Anesthesia, vol. 70, No. 11, Nov. 2015, pp. 1235-1241.
Voelckel, et al., "The Effects of Positive End-Expiratory Pressure During Active Compression Decompression Cardiopulmonary Resuscitation with the Inspiratory Threshold Valve", Anesthesia and Analgesia, vol. 92, No. 4, Apr. 2001, pp. 967-974.
Yannopoulos, et al., "Controlled Pauses at the Initiation of Sodium Nitroprusside-enhanced Cardiopulmonary Resuscitation Facilitate Neurological and Cardiac Recovery After 15 Mins of Untreated Ventricular Fibrillation", Critical Care Medicine, vol. 40, No. 5, May 2012, pp. 1562-1569.

FIG. 14A
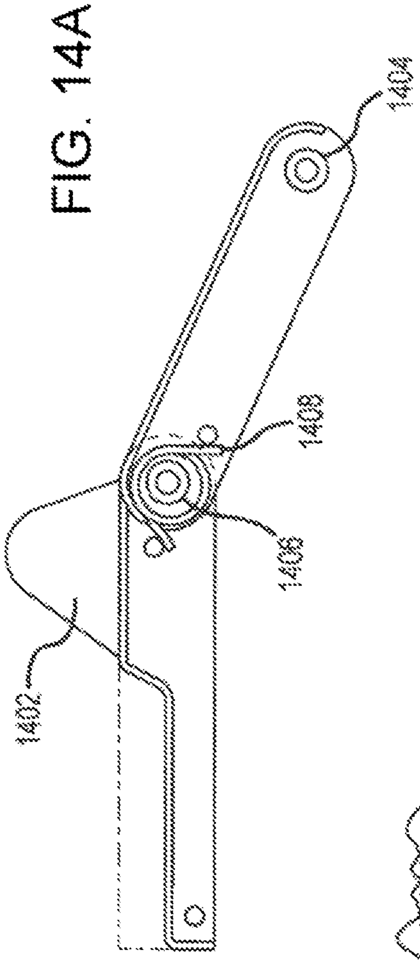
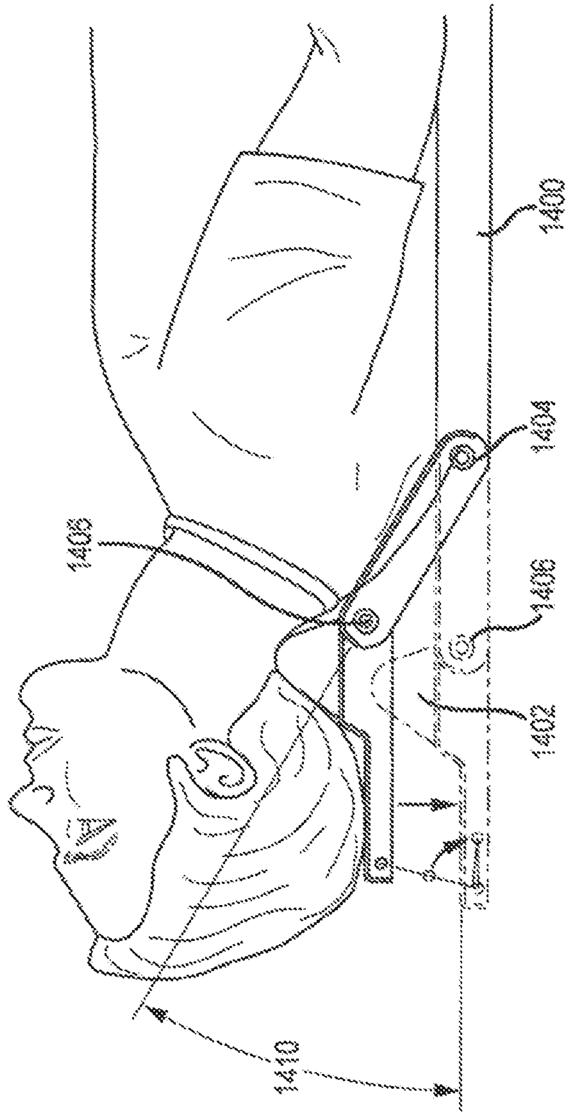
FIG.14

24-HOUR CEREBRAL PERFORMANCE CATEGORY SCORE

| CPC SCORE | NEUROLOGICAL OUTCOME |
|---|---|
| 1 | DEAD |
| 2 | CANNOT BE RESUSCITATED |
| 3 | VERY BAD BRAIN FUNCTION |
| 4 | MODERATE BRAIN DAMAGE |
| 5 | MILD BRAIN DAMAGE |
| 6 | NORMAL |

SYSTEMS AND METHODS FOR HEAD UP CARDIOPULMONARY RESUSCITATION

CROSS-REFERENCES TO RELATED APPLICATIONS

This application is a continuation of U.S. application Ser. No. 17/392,103, filed Aug. 2, 2021, which is a continuation of U.S. application Ser. No. 15/652,023, filed Jul. 17, 2017, now U.S. Pat. No. 11,077,016, which is a continuation of U.S. application Ser. No. 14/935,262, filed Nov. 6, 2015, now U.S. Pat. No. 9,707,152, which claims priority to U.S. Provisional Application No. 62/242,655, filed Oct. 16, 2015, and is also a continuation in part of U.S. application Ser. No. 14/677,562, filed Apr. 2, 2015, now U.S. Pat. No. 10,092,481, which is a continuation of U.S. patent application Ser. No. 14/626,770, filed Feb. 19, 2015, now U.S. Pat. No. 10,245,209, which claims the benefit of U.S. Provisional Application No. 61/941,670, filed Feb. 19, 2014, U.S. Provisional Application No. 62/000,836, filed May 20, 2014 and U.S. Provisional Application No. 62/087,717, filed Dec. 4, 2014, the complete disclosures of which are hereby incorporated by reference for all intents and purposes.

BACKGROUND OF THE INVENTION

The vast majority of patients treated with conventional (C) cardiopulmonary resuscitation (CPR) never wake up after cardiac arrest. Traditional closed-chest CPR involves repetitively compressing the chest in the med-sternal region with a patient supine in an effort to propel blood out of the non-beating heart to the brain and other vital organs. This method is not very efficient, in part because refilling of the heart is dependent upon the generation of an intrathoracic vacuum during the decompression phase that draws blood back to the heart. C-CPR typically provides only 15-30% of normal blood flow to the brain and heart. In addition, with each chest compression, the arterial pressure increases immediately. Similarly, with each chest compression, right-side heart pressures rise to levels nearly identical to those observed on the arterial side. The high right-sided pressures are in turn transmitted to the brain via the paravertebral venous plexus and jugular veins. This increase in blood volume and pressure with each chest compression in the setting of impaired cerebral perfusion further increases intracranial pressure (ICP), thereby reducing cerebral perfusion. In addition, the simultaneous rise of arterial and venous pressure with each C-CPR compression generates contemporaneous bi-directional (venous and arterial) high pressure compression waves that bombard the brain within the closed-space of the skull. This has the potential to further reduce brain perfusion and cause additional damage to the already ischemic brain tissue during C-CPR.

To address these limitations, newer methods of CPR have been developed that significantly augment cerebral and cardiac perfusion, lower intracranial pressure during the decompression phase of CPR, and improve short and long-term outcomes. These methods may include the use of active compression decompression (ACD)+CPR, an impedance threshold device (ITD), and/or combinations thereof. However, despite these advances, most patients still do not wake up after out-of-hospital cardiac arrest.

BRIEF SUMMARY OF THE INVENTION

Embodiments of the invention are directed toward systems and methods of administering CPR to a patient in a head and thorax up position. Such techniques result in lower right-atrial pressures and intracranial pressure while increasing cerebral perfusion pressure, cerebral output, and systolic blood pressure (SBP) compared to CPR administered to an individual in the supine position. The configuration may also preserve a central blood volume and lower pulmonary vascular resistance. This provides a more effective and safe method of performing CPR for extended periods of time. The head and thorax up configuration may also preserve the patient in the sniffing position to optimize airway management.

In one aspect, a method of performing CPR is provided. The method may include elevating the thorax of an individual to a first height relative to a lower body of the individual. The head of the individual may be elevated to a second height relative to the lower body of the individual. The second height may be greater than the first height. CPR may be performed by repeatedly compressing the chest. By elevating the thorax and by also elevating the head to a greater height than the thorax, intracranial pressures may be lowered and cerebral perfusion pressure increased during the performance of CPR. Elevation of the torso and head in this manner may also lower the right atrial pressure and increase coronary perfusion pressure during the performance of CPR. In some cases, the intrathoracic pressure of the individual may also be regulated while performing CPR. In some embodiments, the first height may be between about 3 cm and 8 cm, and the second height may be between about 10 cm and 30 cm.

In another aspect, a method for performing CPR may involve the step of elevating the heart of an individual to a first height relative to a lower body of the individual (with the lower body being in a substantially horizontal plane). The method may also include elevating the head of the individual to a second height relative to the lower body of the individual. The second height may be greater than the first height. With the body in this orientation, any one of a variety of CPR procedures may be performed. In some cases, any one of a variety of intrathoracic pressure regulation procedures may also be performed in combination with the performance of CPR. The first height and the second height may be determined based on one or both of the type of CPR or the type of intrathoracic pressure regulation or some type of physiological feedback [e.g. blood pressure].

In another aspect, a method for performing CPR includes elevating the heart of an individual at a first angle relative to a lower body of the individual. The lower body may be in a substantially horizontal plane. The method may also include elevating the head of the individual at a second angle relative to the lower body such that the head is elevated above the heart. The method may further include performing CPR by repeatedly compressing the chest. In this manner, elevation of the heart and elevation of the head to a greater height than the thorax assists to 1) lower intracranial pressure and increase cerebral perfusion pressure during the performance of CPR and 2) lower right atrial pressure and increase coronary perfusion pressure during the performance of CPR. The method may include regulating the intrathoracic pressure of the individual while performing CPR by multiple potential means including, but not limited to, active compression decompression CPR, an impedance threshold device, actively withdrawing respiratory gases from the thorax between each positive pressure ventilation, load-distributing band CPR, and/or some combination of these approaches.

In another aspect, a system for performing CPR is provided. The system may include a support structure configured to elevate a head and a heart of an individual above a lower body of the individual. The lower body may be in a substantially horizontal plane. The heart may be elevated by the support structure to between about 3 and 8 cm above the substantially horizontal plane and the head may be elevated between about 10 and 30 cm above the substantially horizontal plane.

In some cases, the support structure may also include some type of connector or coupling mechanism that permits a CPR assist device to be easily coupled to the support structure. For example, the connector or coupling mechanism could be configured to receive a CPR compression device or compression vest that is used to compress and/or decompress the chest while the torso and head are elevated. Other mechanisms could be used to connect some type of intrathoracic pressure regulation device as well.

In some cases a CPR compression device capable of compressing the thorax, and in some cases actively decompressing the chest, is attached to the structure that elevates the thorax such that when the thorax is elevated the compression device is able to compress the chest at right angles to the plane of the body. In some cases the structure that elevates the thorax is capable of elevating the thorax at a different angle than the part of the structure that elevates the head.

In another aspect, a system for performing CPR may include a support structure having a first portion configured to elevate a heart of an individual above a lower body of the individual and a second portion configured to elevate a head of the individual above the lower body. The lower body may be in a substantially horizontal plane. The system may also include a mounting disposed on the first portion. The mounting may be configured to removably couple a chest compression device to the first portion such that the chest compression device is coupleable to the mounting to deliver chest compressions to the individual at a substantially perpendicular angle to the first portion. The system may further include a first adjustment mechanism configured to adjust an angle of the first portion between about 3 degrees and 30 degrees relative to the substantially horizontal plane and a second adjustment mechanism configured to adjust an angle of the second portion between about 15 degrees and 45 degrees relative to the substantially horizontal plane.

In some embodiments, the system may include a neck support configured to maintain a position of the individual relative to the support structure such that the individual is properly situated in the “sniffing position” for ventilation, airway management, and for endotracheal intubation. A position of the neck support may be adjustable relative to the support structure. Adjustments of the neck support and one or both of the angle of the first portion or the angle of the second portion may be synchronized such that the individual is properly situated in the “sniffing position” for ventilation, airway management, and for endotracheal intubation throughout the adjustments. A size and/or a shape of the neck support may also be adjustable. In some embodiments, a pivot point of the first portion is coincident with a pivot point of the individual’s upper body. The individual’s pivot point may be in the region of the spinal axis and the scapula region.

BRIEF DESCRIPTION OF THE DRAWINGS

FIG. 14 shows an embodiment of a support structure having an upper support with two pivot points according to embodiments.

FIG. 14A shows the upper support with two pivot points of the support structure of FIG. 14 according to embodiments

DETAILED DESCRIPTION OF THE INVENTION

One aspect of the invention involves CPR techniques where the entire body of a patient is tilted upward. This improves cerebral perfusion and cerebral perfusion pressures after cardiac arrest and up to 8 minutes of CPR and may be done using a combination any one of a variety of automated C-CPR devices and/or any one of a variety of systems for regulating intrathoracic pressure, such as a threshold valve that is interfaces with a patient's airway (e.g., an ITD). With conventional head up CPR, gravity drains venous blood from the brain to the heart, resulting in refilling of the heart after each compression and a substantial decrease in ICP, thereby reducing resistance to forward brain flow. This maneuver also reduces the likelihood of simultaneous high pressure waveform simultaneously compressing the brain during the compression phase. While this may represent a potential significant advance, tilting the entire body upward has the potential to reduce coronary and cerebral perfusion during a prolonged resuscitation effort since over time gravity will cause the redistribution of blood to the abdomen and lower extremities. It is known that the average duration of CPR is over 20 minutes for many patients with out-of-hospital cardiac arrest.

To prolong the elevation of the cerebral and coronary perfusion pressures sufficiently for longer resuscitation efforts, the head may be elevated at between about 10 cm and 30 cm (typically about 15 cm) while the thorax, specifically the heart and/or lungs, is elevated at between about 3 cm and 8 cm (typically about 4 cm) relative to a supporting surface and/or a lower body of the individual. In this way, the difference in height between the head and the heart may be in the range of about 7 cm to about 27 cm. Typically, this involves providing a thorax support and a head support that are configured to elevate the respective portions of the body at different angles and/or heights to achieve the desired elevation with the head raised higher than the thorax and the thorax raised higher than the lower body of the individual being treated. Such a configuration may result in lower right-atrial pressures while increasing cerebral perfusion pressure, cerebral output, and systolic blood pressure SBP compared to CPR administered to an individual in the supine position. The configuration may also preserve a central blood volume and lower pulmonary vascular resistance.

Figure 1A:
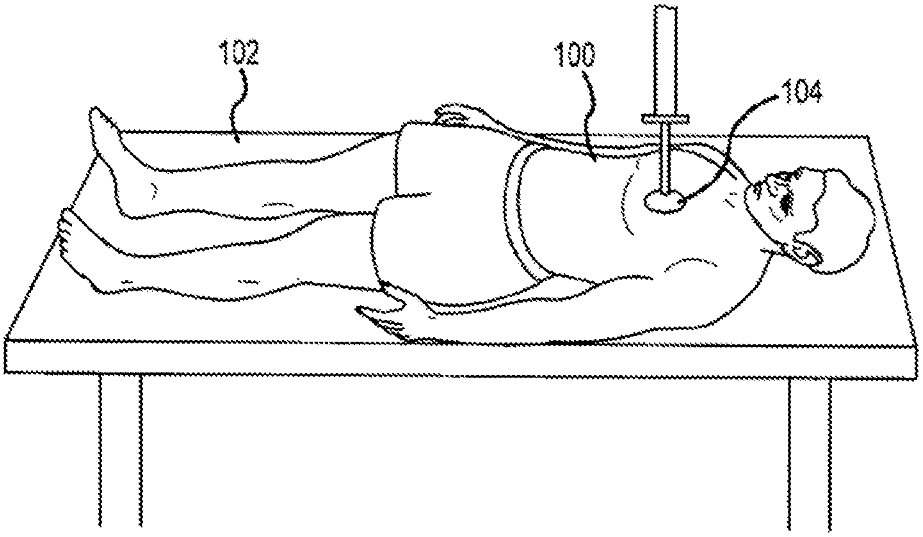
FIG. 1A is a schematic of a patient receiving CPR in a supine configuration according to embodiments.
Figure 1B:
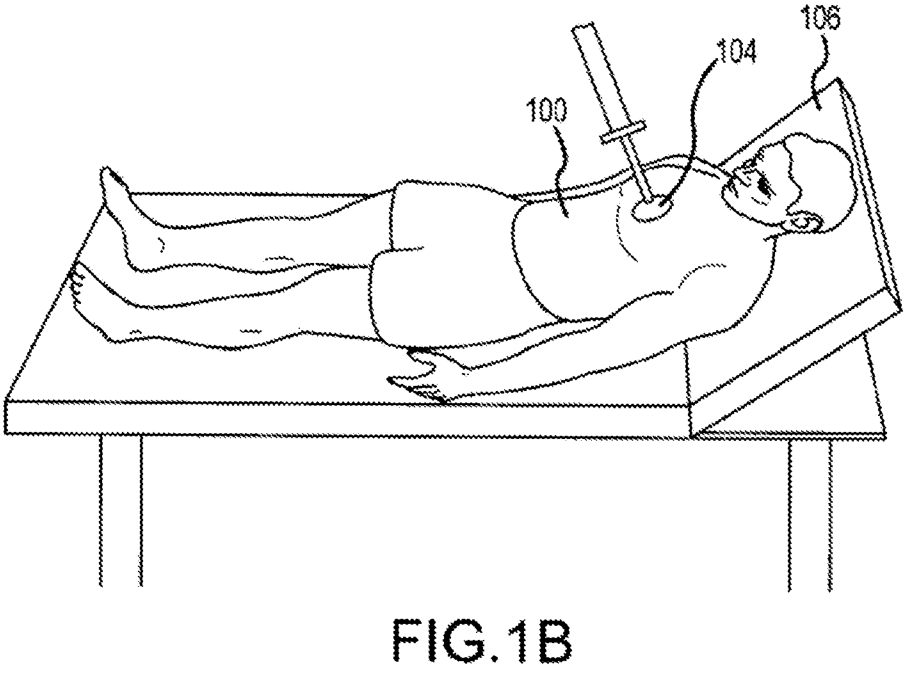
FIG. 1B is a schematic of a patient receiving CPR in a head and thorax up configuration according to embodiments.

Turning now to FIG. 1A, a demonstration of the standard supine (SUP) CPR technique is shown. Here, a patient 100 is positioned horizontally on a flat or substantially flat surface 102 while CPR is performed. CPR may be performed by hand and/or with the use of an automated C-CPR device and/or ACD+CPR device 104. In contrast, a head and thorax up (HUP) CPR technique is shown in FIG. 1B. Here, the patient 100 has its head and thorax elevated above the rest of its body, notably the lower body. The elevation may be provided by one or more wedges or angled surfaces 106 placed under the patient's head and/or thorax, which support the upper body of the patient 100 in a position where both the head and thorax are elevated, with the head being elevated above the thorax.

Figures 2A, 2B, 2C:
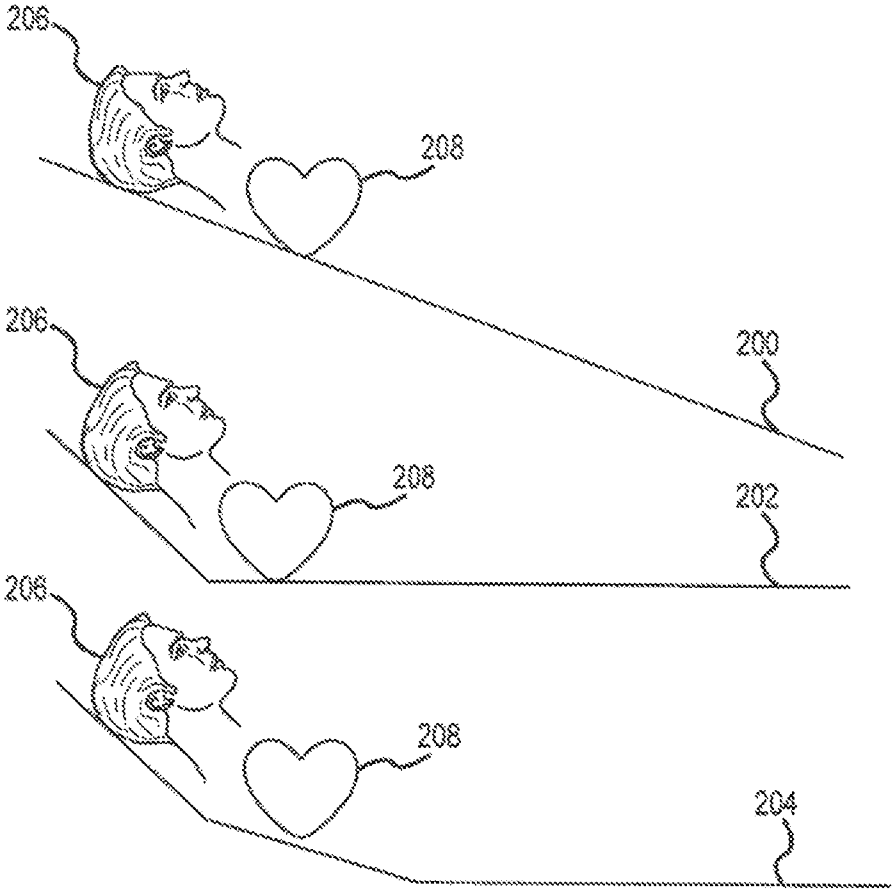
FIG. 2A is a schematic showing a configuration of head up CPR according to embodiments.
FIG. 2B is a schematic showing a configuration of head up CPR according to embodiments.
FIG. 2C is a schematic showing a configuration of head up CPR according to embodiments.

FIGS. 2A-C demonstrate various set ups for HUP CPR as disclosed herein. Configuration 200 in FIG. 2A shows a user's entire body being elevated upward at a constant angle. As noted above, such a configuration may result in a reduction of coronary and cerebral perfusion during a prolonged resuscitation effort since blood will tend to pool in the abdomen and lower extremities over time due to gravity. This reduces the amount of effective circulating blood volume and as a result blood flow to the heart and brain decrease over the duration of the CPR effort. Thus, configuration 200 is not ideal for administration of CPR over longer periods, such as those approaching average resuscitation effort durations. Configuration 202 in FIG. 2B shows only the patient's head 206 being elevated, with the heart and thorax 208 being substantially horizontal during CPR. Without an elevated thorax 208, however, systolic blood pressures and coronary perfusion pressures are lower as lungs are more congested with blood when the thorax is supine or flat. This, in turn, increases pulmonary vascular resistance and decreases the flow of blood from the right side of the heart to the left side of the heart when compared to CPR in configuration 204. Configuration 204 in FIG. 2C shows both the head 206 and heart/thorax 208 of the patient elevated, with the head 206 being elevated to a greater height than that heart/thorax 208. This results in lower right-atrial pressures while increasing cerebral perfusion pressure, cerebral output, and systolic blood pressure compared to CPR administered to an individual in the supine position, and may also preserve a central blood volume and lower pulmonary vascular resistance.

Figure 3:
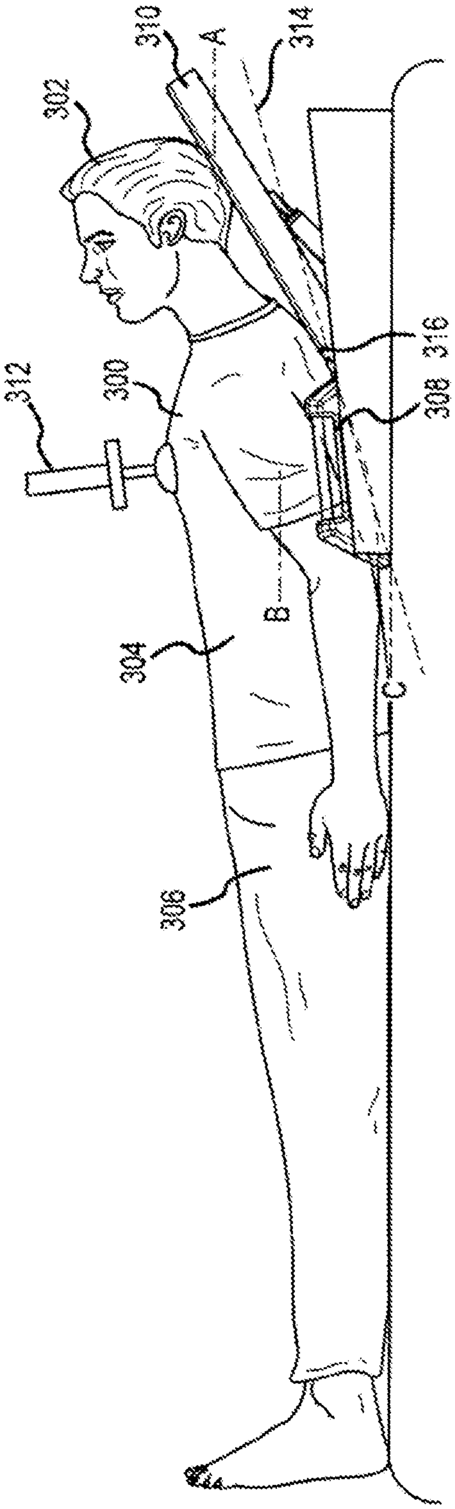
FIG. 3 shows a patient receiving CPR in a head and thorax up configuration according to embodiments.

FIG. 3 depicts a patient 300 having its head 302 and thorax 304 elevated above its lower body 306. This may be done, for example, by using one or more supports to position the patient 300 appropriately. Here lower support 308 is positioned under the thorax 304 to elevate the thorax 304 to a desired height B, which is typically between about 3 cm and 8 cm. Upper support 310 is positioned under the head 302 such that the head 302 is elevated to a desired height A, typically between about 10 cm and 30 cm. Thus, the patient 300 has its head 302 at a higher height A than thorax at height B, and both are elevated relative to the flat or supine lower body at height C. Typically, the height of lower support 308 may be achieved by the lower support 308 being at an angle of between about 3° and 15° from a substantially horizontal plane with which the patient's lower body 306 is aligned. Upper support 310 is often at an angle between about 15° and 45° above the substantially horizontal plane. In some embodiments, one or both of the upper supper 310 and lower support 308 is adjustable such that an angle and/or height may be altered to match a type a CPR, ITP regulation, and/or body size of the individual. As shown here, lower support 308 is fixed at an angle, such as between 3° and 15° from a substantially horizontal plane. The upper support 31400 may adjust by pivoting about an axis 314. This pivoting may involve a manual adjustment in which a user pulls up or pushes down on the upper support 310 to set a desired position. In other embodiments, the pivoting may be driven by a motor or other drive mechanism. For example, a hydraulic lift coupled with an extendable arm may be used. In other embodiments, a screw or worm gear may be utilized in conjunction with an extendable arm or other linkage. Any adjustment or pivot mechanism may be coupled between a base of the support structure and the upper support 310 In some embodiments, a neck support may be positioned on the upper support to help maintain the user in a proper position.

As one example, the lower body 306 may define a substantially horizontal plane. A first angled plane may be defined by a line formed from the patient's chest 304 (heart and lungs) to his shoulder blades. A second angled plane may be defined by a line from the shoulder blades to the head 302. The first plane may be angled about between 5° and 15° above the substantially horizontal plane and the second plane may be at an angle of between about 15° and 45° above the substantially horizontal plane.

Lower support 308 and/or upper support 310 may be wedges used to prop up the head and/or thorax of a patient. In some embodiments, a CPR wedge may be formed of a rigid material so that the patient, and the patient's back, neck and head, may be held in a substantially stationary position while CPR is performed. In some embodiments, a CPR wedge may be inflatable. A CPR wedge may be "hollow" so that any of a variety of tools such as CPR tools and an automated external defibrillator (AED), for example, may be stored therein. In some embodiments a backboard may be used as a support. In other embodiments, a hospital cart or bed may be inclinable such that the head and thorax may be elevated to different heights. It will be appreciated that suitable supports may include any structure providing sufficient support to maintain a patient in the described elevated position while undergoing CPR administration. While shown here with two supports having different heights and angles, it will be appreciated that one or more supports having the same angle relative to horizontal may be used to position the head 302 above the thorax 304, which is positioned above the lower body 306. The patient 300 may receive CPR in this elevated position.

In some embodiments, the support structure may include one or more of a flat portions, each having a constant angle of elevation relative to a substantially horizontal plane. In other embodiments, the support structure may have one or more contoured or curved portions, each having a variable angle of elevation relative to the horizontal plane. This may help the support structure more closely match natural contours of the human body. In some embodiments, a combination of flat and contoured portions may be used.

The type of CPR being performed on the elevated patient may vary. Examples of CPR techniques that may be used include manual chest compression, chest compressions using an assist device such as assist device 312, either automated or manually, ACD CPR, load-distributing band, standard CPR, stutter CPR, and the like. Such processes and techniques are described in U.S. Pat. Pub. No. 2011/0201979 and U.S. Pat. Nos. 5,454,779 and 5,645,522, all incorporated herein by reference. Further various sensors may be used in combination with one or more controllers to sense physiological parameters as well as the manner in which CPR is being performed. The controller may be used to vary the manner of CPR performance, adjust the angle of inclination, provide feedback to the rescuer, and the like. Further, a compression device could be simultaneously applied to the lower extremities to squeeze venous blood back into the upper body, thereby augmenting blood flow back to the heart.

Additionally, a number of other procedures may be performed while CPR is being performed on the patient in the torso-elevated state. One such procedure is to periodically prevent or impede the flow in respiratory gases into the lungs. This may be done by using a threshold valve, sometimes also referred to as an impedance threshold device (ITD), that is configured to open once a certain negative intrathoracic pressure is reached. The invention may utilize any of the threshold valves or procedures using such valves that are described in U.S. Pat. Nos. 5,551,420; 5,692,498; 5,730,122; 6,029,667; 6,062,219; 6,155,257; 6,234,916; 6,224,562; 6,526,973; 6,604,523; 6,986,349; and 7,204,251, the complete disclosures of which are herein incorporated by reference.

Another such procedure is to manipulate the intrathoracic pressure in other ways, such as by using a ventilator or other device to actively withdraw gases from the lungs. Such techniques as well as equipment and devices for regulating respirator gases are described in U.S. Pat. Pub. No. 2010/0031961, incorporated herein by reference. Such techniques as well as equipment and devices are also described in U.S. patent application Ser. Nos. 11/034,996 and 10/796,875, and also U.S. Pat. Nos. 5,730,122; 6,029,667; 7,082,945; 7,185,649; 7,195,012; and 7,195,013, the complete disclosures of which are herein incorporated by reference.

In some embodiments, the angle and/or height of the head and/or heart may be dependent on a type of CPR performed and/or a type of intrathoracic pressure regulation performed. For example, when CPR is performed with a device or device combination capable of providing more circulation during CPR, the head may be elevated higher, for example 10-30 cm above the horizontal plane (10-45 degrees) such as with ACD+ITD CPR. When CPR is performed with less efficient means, such as manual conventional standard CPR, then the head will be elevated less, for example 5-20 cm or 10 to 20 degrees.

Figure 4:
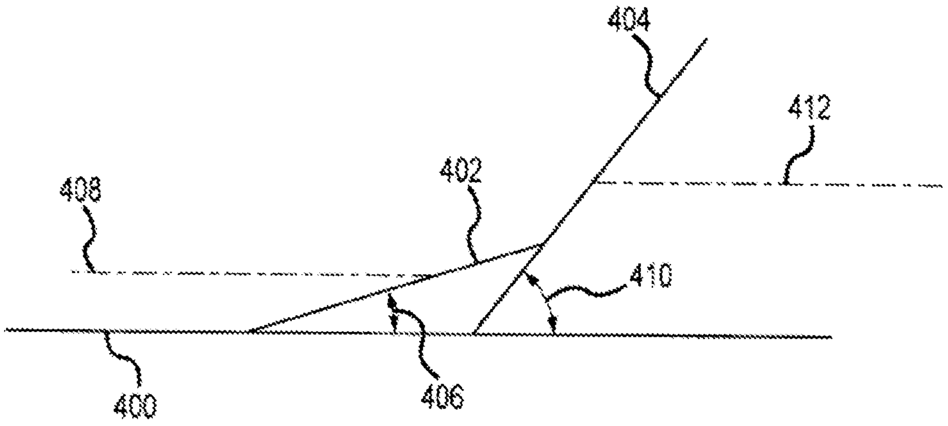
FIG. 4 is schematic showing various configurations of a patient being treated with a form of CPR and/or ITP regulation according to embodiments.

FIG. 4 shows a schematic of various configurations of a patient being treated with a form of CPR and/or intrathoracic pressure (ITP) regulation, which can be achieved by multiple potential means including, but not limited to, active compression decompression CPR, an impedance threshold device, actively withdrawing respiratory gases from the thorax between each positive pressure ventilation, load-distributing band CPR, or some combination of these approaches. A lower body of a patient may be positioned along a substantially horizontal plane 400. The thorax, notably the heart and lungs of the patient, may be positioned along a first angled plane 402. The head may be positioned along a second angled plane 404. Based on the type of CPR and/or ITP regulation being administered, the first angled plane 402 and/or the second angled plane 404 may be adjusted to meet the particular demands. For example, the first angled plane 402 may have an angle 406 relative to horizontal plane 400. Angle 406 may be between about 5° and 15° above horizontal plane 400. This may position the heart at a height 408 of between about 3 cm and 8 cm above horizontal plane 400. The second angled plane 404 may be at an angle 410 relative to horizontal plane 400. Angle 410 may be between about 15° and 45° above horizontal plane 400. This may position the head at a height 412 of between about 10 cm and 30 cm. In some embodiments, the first angled plane 402 and second angled plane 404 may be at the same angle relative to horizontal plane 400. In some embodiments, height 408 may be measured based on a position of the patient's heart. Height 412 may be measure from a feature of the head, such as the occiput.

In such embodiments, the two angled planes may be a single surface or may be separate surfaces. In some embodiments, one or both of the first angled plane 402 and the second angled plane 404 may be adjustable such that a height and/or angle of the plane may be adjusted to match a particular type of CPR and/or ITP regulation being administered to a patient. The planes may also be adjusted to handle patients of various sizes, as a distance between the patient's head and heart may be far away from an average value that the patient may necessitate a different angle for one or both of the first angled plane 402 and the second angled plane 404 to achieve desired heights of the head and heart.

A variety of equipment or devices may be coupled to or associated with the structure used to elevate the head and torso to facilitate the performance of CPR and/or intrathoracic pressure regulation. For example, a coupling mechanism, connector, or the like may be used to removably couple a CPR assist device to the structure. This could be as simple as a snap fit connector to enable a CPR assist device to be positioned over the patient's chest. Examples of CPR assist devices that could be used with the support structure (either in the current state or a modified state) include the Lucas device, sold by Physio-Control, Inc. and described in U.S. Pat. No. 7,569,021, the entire contents of which is hereby incorporated by reference, the Defibtech Lifeline ARM—Hands-Free CPR Device, sold by Defibtech, the Thumper mechanical CPR device, sold by Michigan Instruments, automated CPR devices by Zoll, the AutoPulse, U.S. Pat. No. 7,056,296, the entire contents of which is hereby incorporated by reference, and the like.

Similarly, various commercially available intrathoracic pressure devices could be removably coupled to the support structure. Examples of such devices include the Lucas device (Physio-control) U.S. Pat. No. 7,569,021, the Weil Mini Chest Compressor Device, U.S. Pat. No. 7,060,041 (Weil Institute), the entire contents of which is hereby incorporated by reference, the Zoll AutoPulse, and the like.

Figure 5:
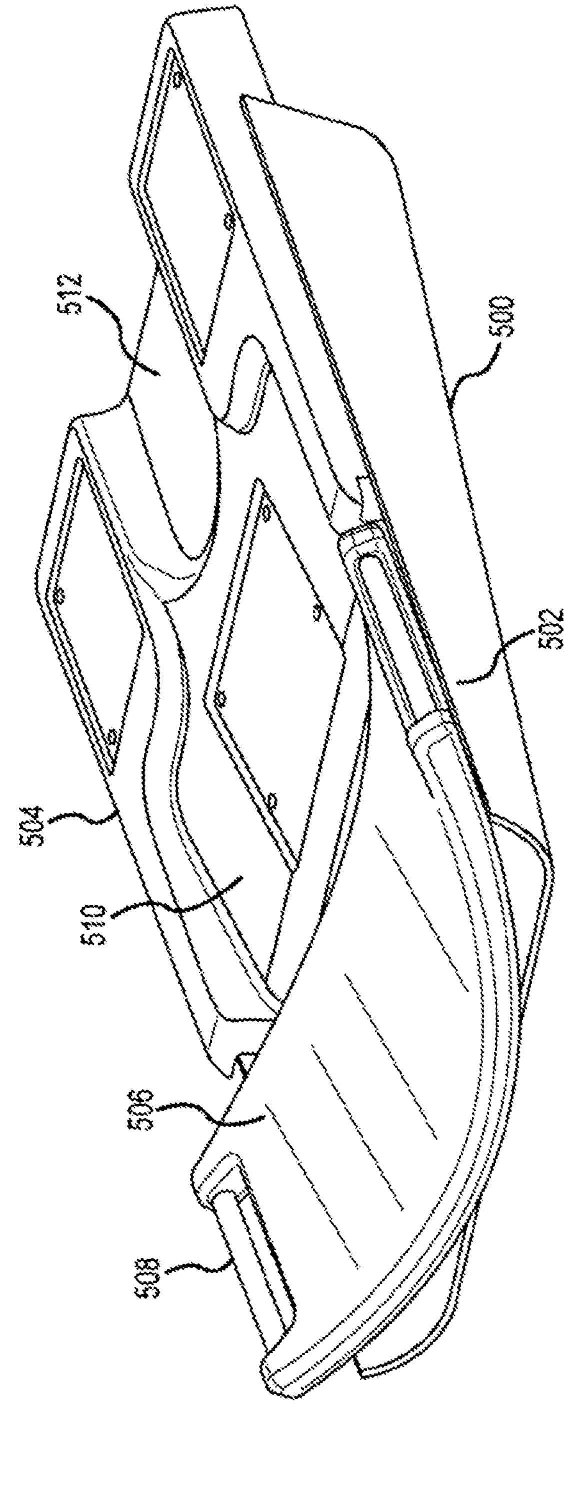
FIG. 5 is an isometric view of a support structure in a stowed configuration for head and thorax up CPR according to embodiments.

FIGS. 5-8 depict one embodiment of a support structure 500 for elevating a patient's head and heart. FIG. 5 is an isometric view of support structure 500 in a stowed configuration. Support structure 500 may have a first portion 502 configured to receive and elevate the patient's thorax and a second portion 504 configured to receive and elevate the patient's head. The first portion 502 may include a mounting 506 configured to receive the patient's back. Mounting 506 may be contoured to match a contour of the patient's back and may include one or more couplings 508. Couplings 508 may be configured to connect a chest compression device to support structure 500. For example, couplings 508 may include one or more mating features that may engage corresponding mating features of a chest compression device. As one example, a chest compression device may snap onto or otherwise receive the couplings 508 to secure the chest compression device to the support structure 500. Any one of the devices described above could be coupled in this manner. The couplings 508 may be angled to match an angle of elevation of the first portion 502 such that the chest compression is secured at an angle to deliver chest compressions at an angle substantially orthogonal to the patient's thorax/heart. In some embodiments, the couplings 508 may extend beyond an outer periphery of the first portion 502 such that the chest compression device may be connected beyond the sides of the patient's body. In some embodiments, mounting 506 may be removable. In such embodiments, first portion 502 may include one or more mounting features (not shown) to receive and secure the mounting 506 to the support structure 500.

Second portion 504 may include positioning features to help medical personnel properly position the patient. For example, indentations 510 and 512 may indicate where to position the patient's shoulders and head, respectively. In some embodiments, a neck support, such as a pad or pillow or other protrusion, may be included. This may help support the neck and allow the patient's head to rest on the second portion 504. In some embodiments, the second portion 504 may also include a coupling for an ITD device to be secured to the support structure 500, or any of the other intrathoracic pressure regulation devices described herein.

Figure 6:
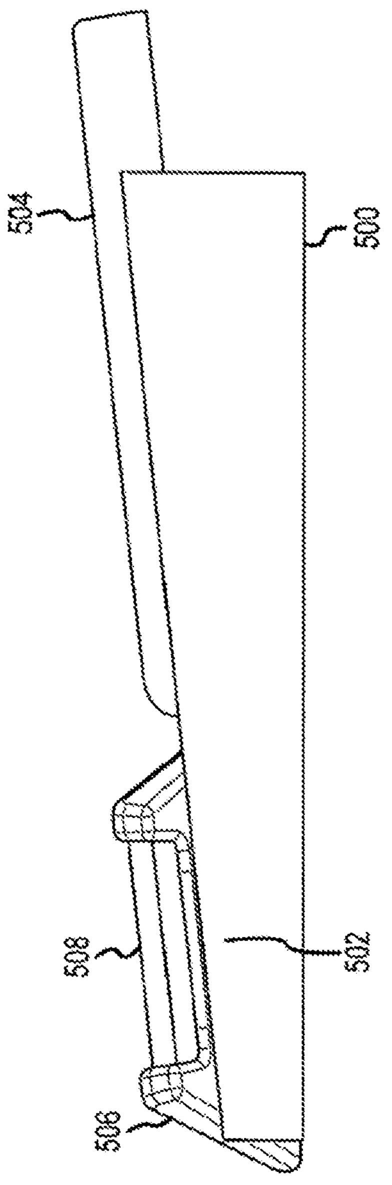
FIG. 6 is a side view of the support structure of FIG. 5 in a stowed configuration according to embodiments.

FIG. 6 is a side view of support structure 500 in the stowed configuration. In the stowed configuration, the first portion 502 and/or second portion 504 may be at their lowest height relative to a horizontal plane, such as the surface on which the support structure 500 is positioned. Typically, first portion 502 may be positioned at an angle of between about 5° and 15° relative to the horizontal plane and at a height of between about 3 cm and 8 cm above the horizontal plane. Second portion 504 is often within about 15° and 45° relative to the horizontal plane and between about 10 cm and 30 cm above the horizontal plane. Here, first portion 502 and second portion 504 are at a same or similar angle, with the second portion 504 being elevated above the first portion 502, although other support structures may have the first portion and second portion at different angles in the stowed position. In the stowed position, first portion 502 and/or second portion 504 may be near the lower ends of the height and/or angle ranges.

Figure 7:
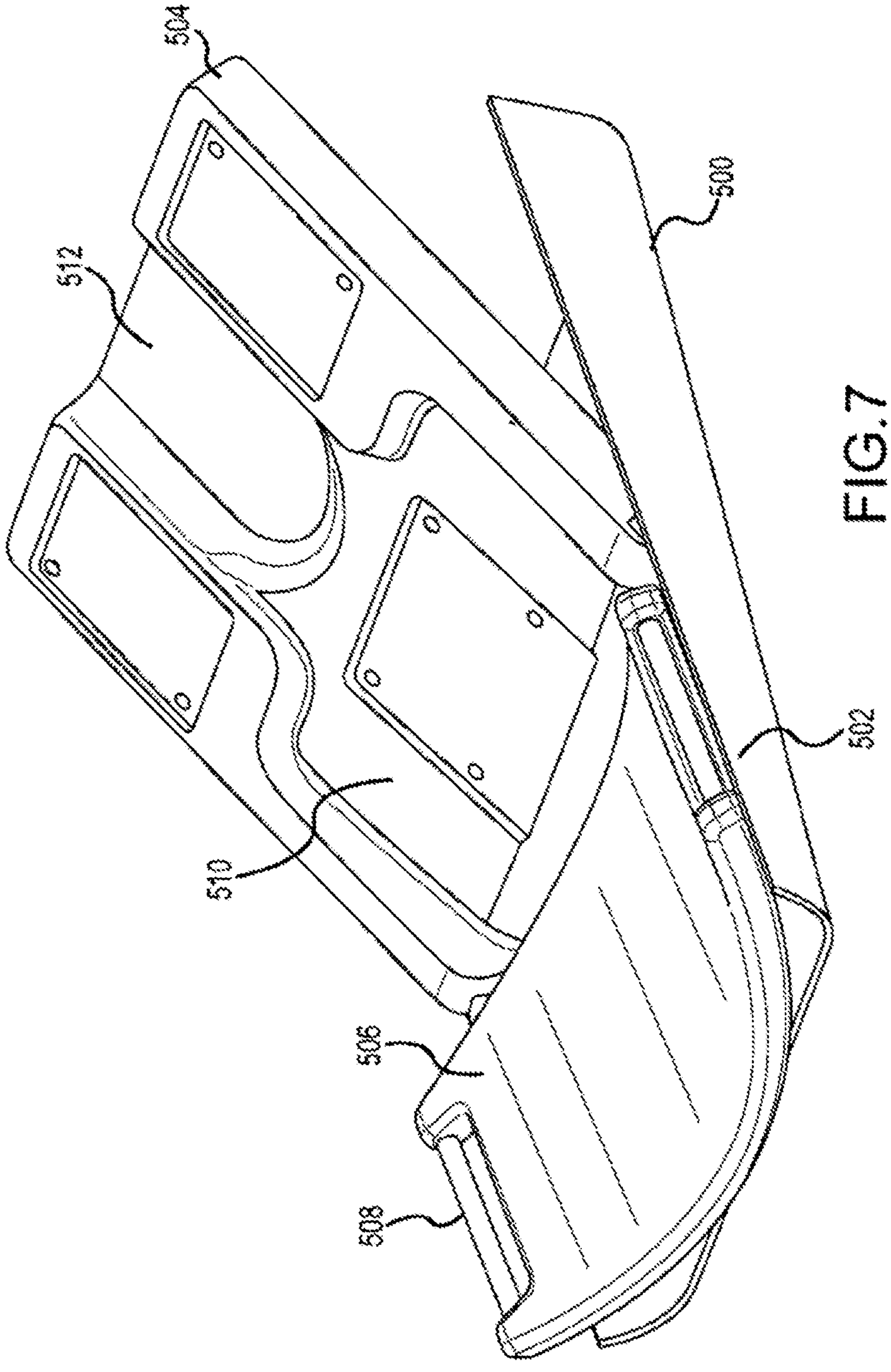
FIG. 7 is an isometric view of the support structure of FIG. 5 in an elevated configuration according to embodiments.
Figure 8:
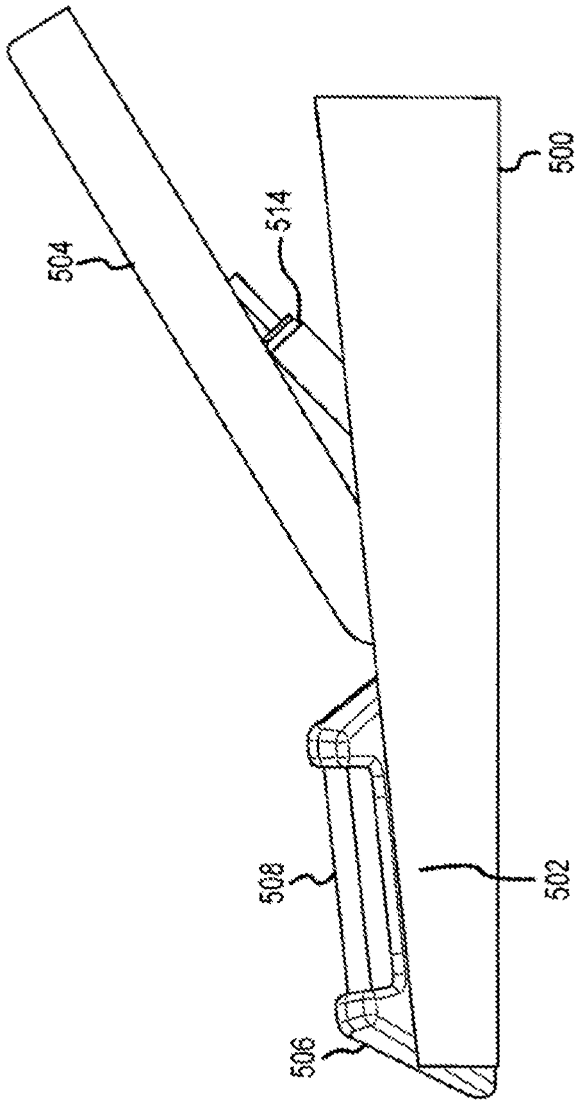
FIG. 8 is a side view of the support structure of FIG. 5 in an elevated configuration according to embodiments.

FIG. 7 shows an isometric view of the support structure 500 in an elevated configuration. In the elevated configuration, one or both of the first portion 502 and the second portion 504 may be elevated beyond the angle and height of the stowed configuration. The elevated configuration may encompass any of the higher angles within the range. For example, the elevated configuration may include angles above 15° for the second portion 504. Support structure 500 may include one or more elevation mechanisms 514 configured to raise and lower the first portion 502 and/or second portion 504 as seen in FIG. 8. For example, elevation mechanism 514 may include a mechanical and/or hydraulic extendable arm configured to lengthen to raise the second portion 504 to a desired height and/or angle, which may be determined based on the patient's body size, the type of CPR being performed, and/or the type of ITP regulation being performed. The elevation mechanism 514 may manipulate the support structure 500 between the storage configuration and the elevated configuration. The elevation mechanism 514 may be configured to adjust the height and/or angle of the second portion 504 throughout the entire ranges of 15° and 45° relative to the horizontal plane and between about 10 cm and 30 cm above the horizontal plane. In some embodiments, the elevation mechanism 514 may be manually manipulated, such as by a user lifting up or pushing down on the second portion 504 to raise and lower the second portion. In other embodiments, the elevation mechanism 514 may be electrically controlled such that a user may select a desired angle and/or height of the second portion 504 using a control interface. While shown here with only an adjustable second portion 504, it will be appreciated that first portion 502 may also be adjustable.

During administration of various types of head and thorax up CPR, it is advantageous to maintain the patient in the "Sniffing Position" where the patient is properly situated for endotracheal intubation. In such a position, the neck is flexed and the head extended, allowing for patient intubation and airway management. During elevation of the upper body, the Sniffing Position may require that a center of rotation of an upper support structure supporting the patient's head be co-incident to a center of rotation of the upper head and neck region. The center of rotation of the upper head and neck region may be in a region of the spinal axis and the scapula region. Maintaining the Sniffing Position of the patient may be done in several ways.

Figure 9A:
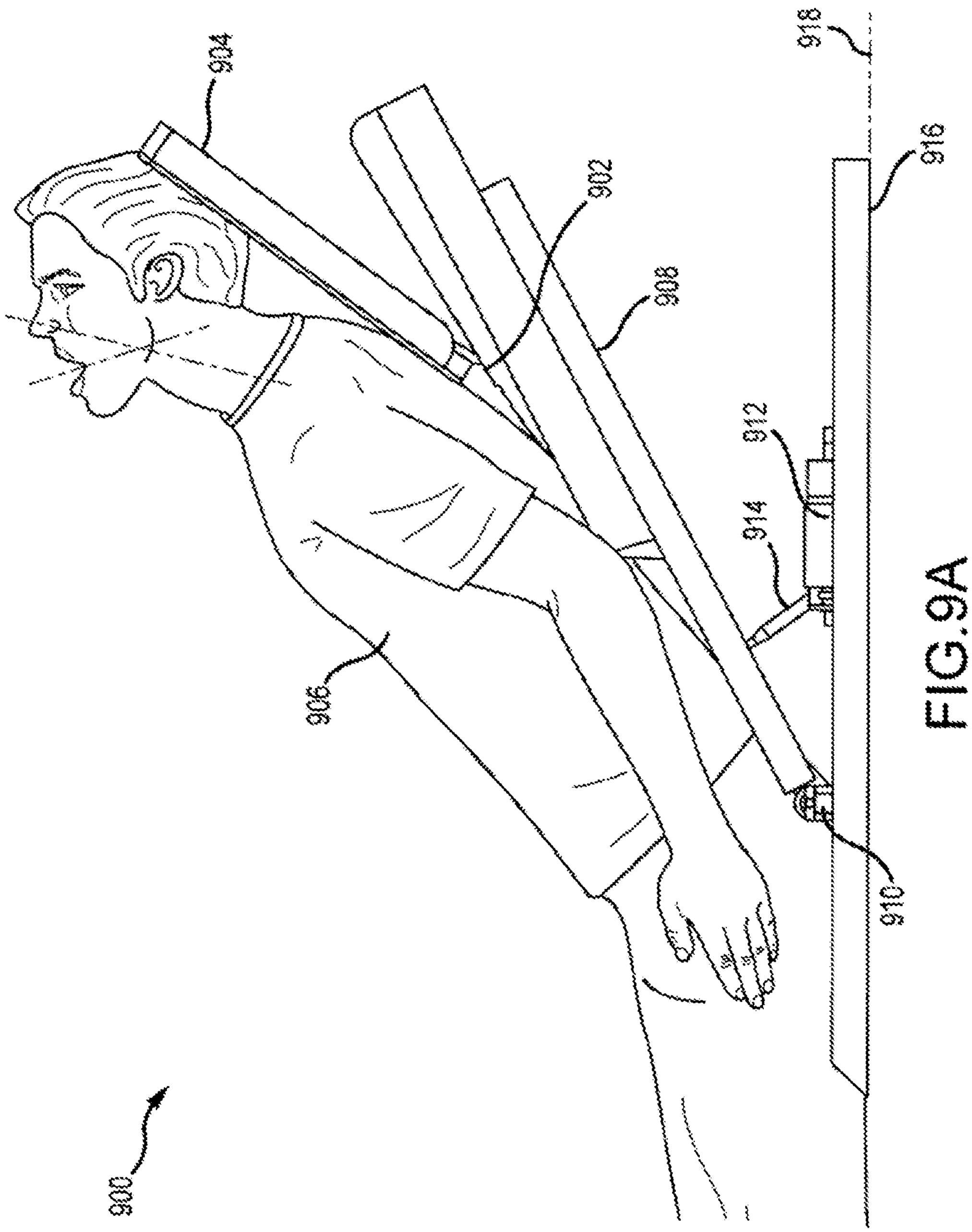
FIG. 9A depicts a support structure configured to maintain a pivot point of an upper support co-incident with a pivot point of the upper body of a patient according to embodiments.

FIG. 9A depicts a support structure 900 configured to maintain a pivot point 902 of an upper support 904 co-incident with a pivot point of the upper body of a patient 906. In such configurations, the upper support structure 904 is maintained in the same relative position as the head and neck, allowing the patient 906 to stay in the optimal Sniffing Position during the head and thorax up CPR procedure. In some embodiments, the pivot point 902 may be movable such that the pivot point 902 may be aligned with the upper body center of flexure of patients of various sizes. Support structure 900 may include a lower support 908 configured to pivot about pivot point 910. In some situations, increased elevation may be desired. For example, a type of CPR and/or ITP regulation may necessitate higher or lower elevation of the heart and/or head. In some embodiments, one or more physiological monitors, such as a blood pressure monitor or carotid flow monitor, such as a Doppler probe, may be used to optimize an angle and/or height of elevation. Based on flow or pressure measurements, and in some cases a type of CPR and/or ITP regulation, the elevation of the thorax and/or head may be adjusted automatically. Higher angles and/or elevations may be associated with higher flow rates, such as elevated flow rates due to a combination of ACD CPR and use of an ITD.

To achieve the adjustability of angles and/or heights, the lower support 908 and/or upper support 904 may be elevated using a motor and corresponding linkage. For example, the lower support 908 may be coupled to a lower support structure motor 912 and lower support structure linkage 914. The lower support structure motor 912 may be coupled with a base 916 of the support structure 900. The lower support structure motor 912 may be coupled with the lower support 908 using lower support structure linkage 914, which may shorten and extend as the lower support 908 raises and lowers. The lower support 908 may adjust to elevation angles between about 5° and 30° above a horizontal plane 918 such that the head is elevated about 3 cm and 8 cm above the horizontal plane 918. A similar motor and/or linkage may be coupled with the upper support 904 and/or a portion of the lower support 908 and/or base 916. The upper support 904 may be elevated at an angle of between about 20° and 45° above the horizontal plane 918 such that the head is at a height of between about 10 cm and 30 cm relative to the horizontal plane 918.

It will be appreciated that adjustment mechanisms other than motors may be utilized. For example, manual gear and/or ratcheting mechanisms may be used to adjust and maintain a support in a desired position.

In some embodiments, the motors may be coupled with a processor or other computing device. The computing device may communicate with one or more input devices such as a keypad, and/or may couple with sensors such as flow and pressure sensors. This allows a user to select an angle and/or height of the heart and/or head. Additionally, sensor inputs may be used to automatically control the motor and angle of the supports based on flow and pressure measurements, as well as a type of CPR and/or ITP regulation.

In some embodiments, support structure 900 may include a neck support that helps maintain the patient's head and neck in the Sniffing Position. A vertical height of the neck support relative to the upper support 904 may be adjustable to accommodate patients of different sizes. Additionally, the lateral position of the neck support may be adjustable to further accommodate various patients and ensure that each patient is in the optimal Sniffing Position.

In some embodiments, a support structure such as support structure 900 may have a static preset thoracic angle that is nominally level. Such a support structure permits manual and/or automatic CPR while the upper head/neck/shoulders are elevated while the support structure is in operation to improve circulatory performance. Increased elevation angles are important due to various factors, such as a type of CPR, a type of ITP regulation, and/or based on physiological factors [e.g. blood pressure]. Important features of this elevation are the height of the heart and the height of the head, which may be measured from the center of mass of the body. To gain greater angles and a more effective CPR process, some embodiments involve inclining the entire upper body in combination with a head and thorax up support structure. In some embodiments, the support structure is configured to rotate the entire thoracic region during manual and/or automated CPR. This may be accomplished by utilizing a geared motor with a worm gear or screw such that the force generated by the motor is correctly applied to a fulcrum to cause the entire thoracic region, including the head and neck, along with any apparatus being used for the purpose of manual and/or automated CPR and any device for controlling the motion of the head and neck for various purposes, such as airway management, to be elevated.

Figure 9B:
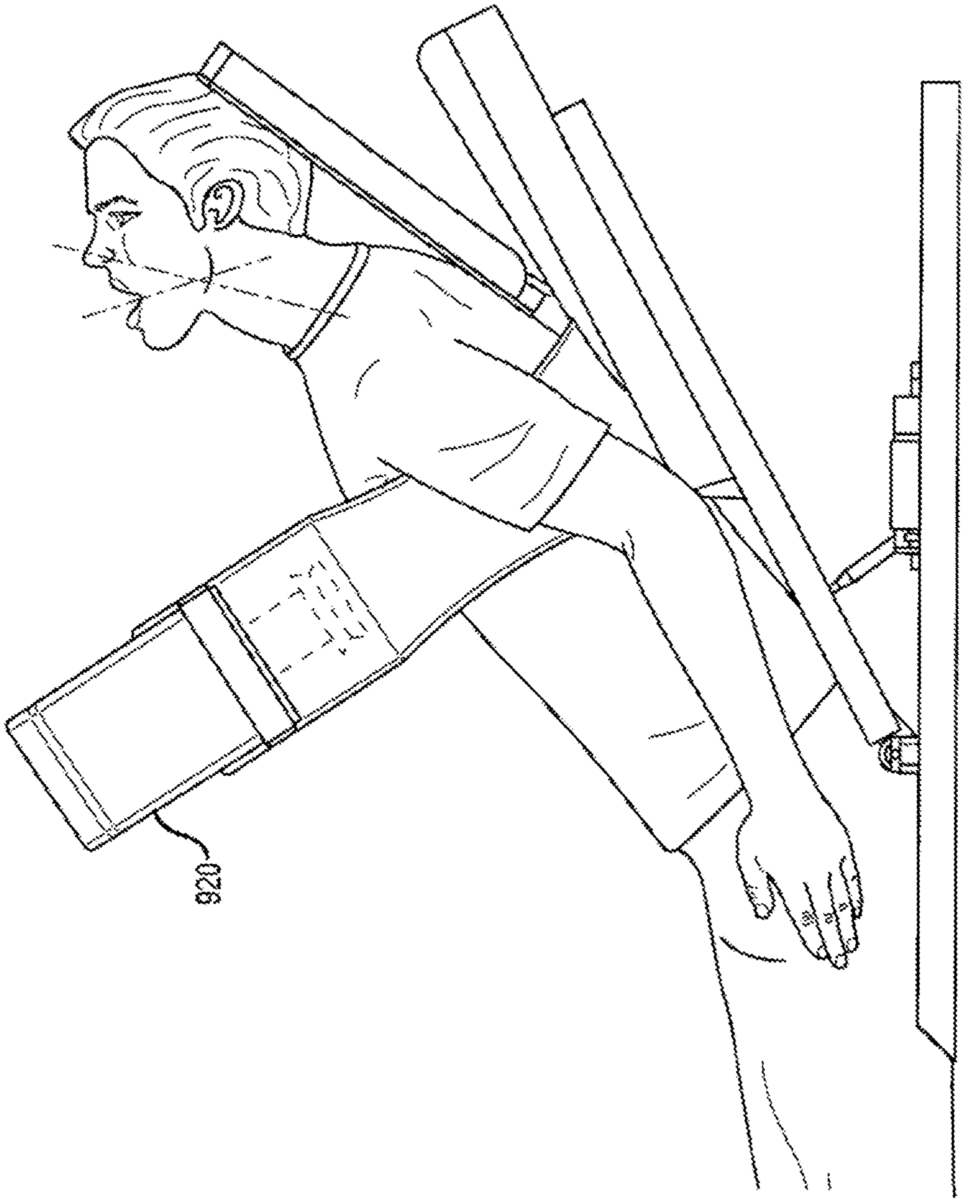
FIG. 9B shows the support structure of FIG. 9A coupled with a chest compression device according to embodiments.

FIG. 9B shows support structure 900 coupled with a chest compression device 920. Chest compression device 920 may be coupled with a mounting (not shown) of the support structure 900 such that the chest compression device 920 is at a substantially perpendicular angle to the lower support 908. In some embodiments, this is achieved by the mounting being positioned on the lower support 908. In some embodiments, the device may be used to perform automated active compression decompression (ACD) CPR. This ensures that as an angle of the lower support 908 is altered, the chest compression device 920 is maintained at a constant perpendicular angle to the lower support 908. This allows the chest compression device 920 to deliver chest compressions (and in some cases, chest decompression) to the patient's chest and heart at a substantially perpendicular angle.

While shown as being positioned under an entire torso of the patient, it will be appreciated that the support structure may be positioned under only a portion of the upper body, such as just the portion above the ribcage. In each embodiment of support structure described herein, the positioning of the support structure may be such that the heart and head are elevated to a desired height and/or angle relative to a horizontal plane.

Figure 10A:
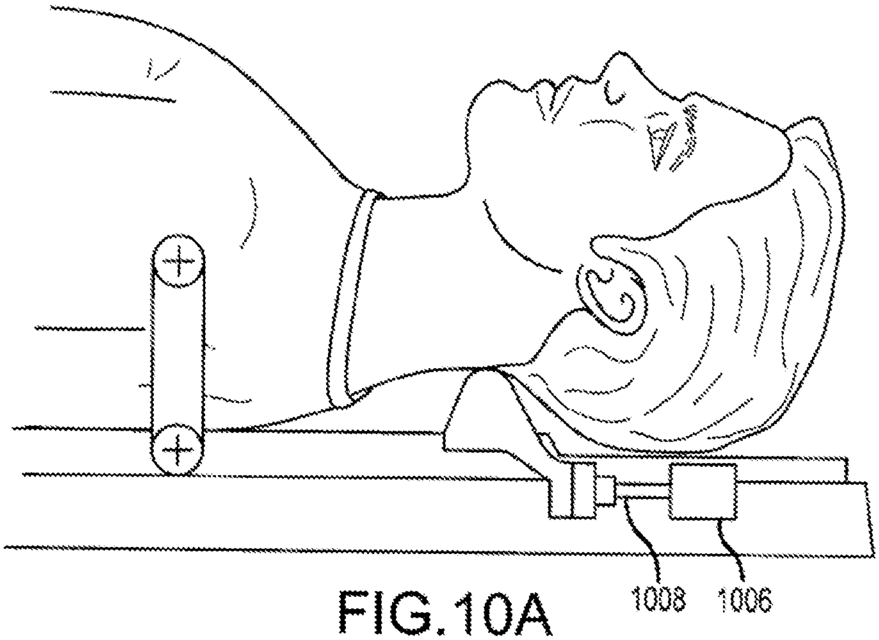
FIG. 10A depicts a support structure having an adjustable neck support according to embodiments.

FIG. 10A depicts a support structure 1000 having an adjustable neck support 1002. Neck support 1002 may be positioned on an upper support 1004 and may be configured to move along the upper support 1004 as the upper support 1004 is elevated to maintain the patient in the Sniffing Position. The movement of the upper support 1004 and neck support 1002 may be synchronized. A primary motor (not shown) and worm gear similar to the motor of support structure 900 may be used to elevate the upper support 1004 from a supine position to up to about 30° above horizontal. A secondary motor 1006 and worm gear 1008 may be used to control the position of the neck support 1002 relative to the upper support 1004. For example, the secondary motor 1006 may be at a supine position along worm gear 1008 when the support structure 1000 is in a supine configuration as in FIG. 10A.

Figure 10B:
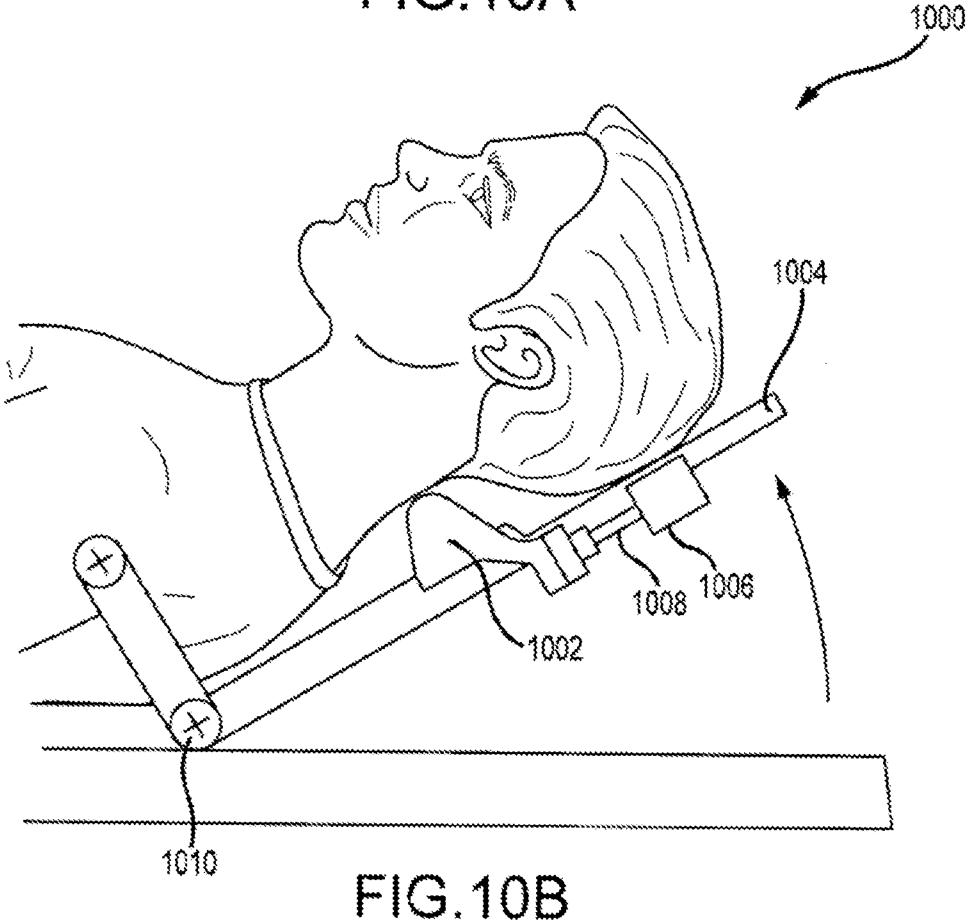
FIG. 10B shows the support structure of FIG. 10A in an elevated configuration according to embodiments.

FIG. 10B shows support structure 1000 in an elevated configuration. Here, the secondary motor 1006 may be positioned at a distance along the worm gear 1008. For example, at maximum elevation, the secondary motor 1006 may be at a maximum distance of travel along worm gear 1008, while intermediate angles may be achieved as the secondary motor 1006 is between the supine position and the maximum distance of travel. As the primary motor elevates the upper support 1004, the position of neck support 1002 may be adjusted to maintain the patient in the optimal Sniffing Position. The actuation of the primary and/or secondary motors 1006 may be controlled by a computing device that executes software that analyzes a patient's body shape and/or height to determine a correct position of the upper support 1004 and/or neck support 1002. In some embodiments, support structure 1000 may be configured such that a pivot point 1010 of upper support 1004 is co-incident with the center of flexure of the patient.

Figure 11:
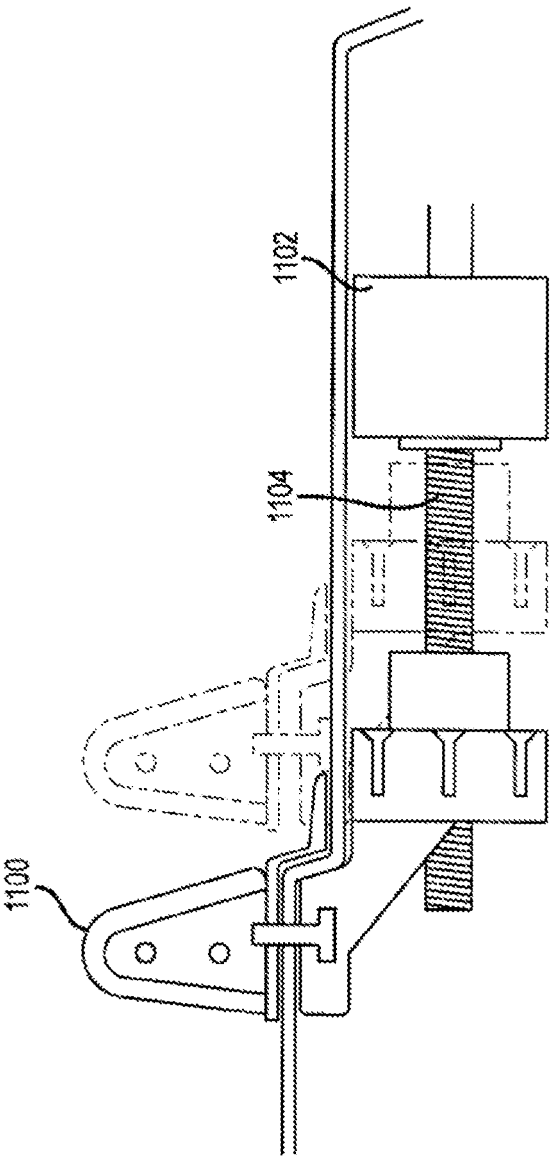
FIG. 11 depicts movement of a neck support according to embodiments.
Figure 12:
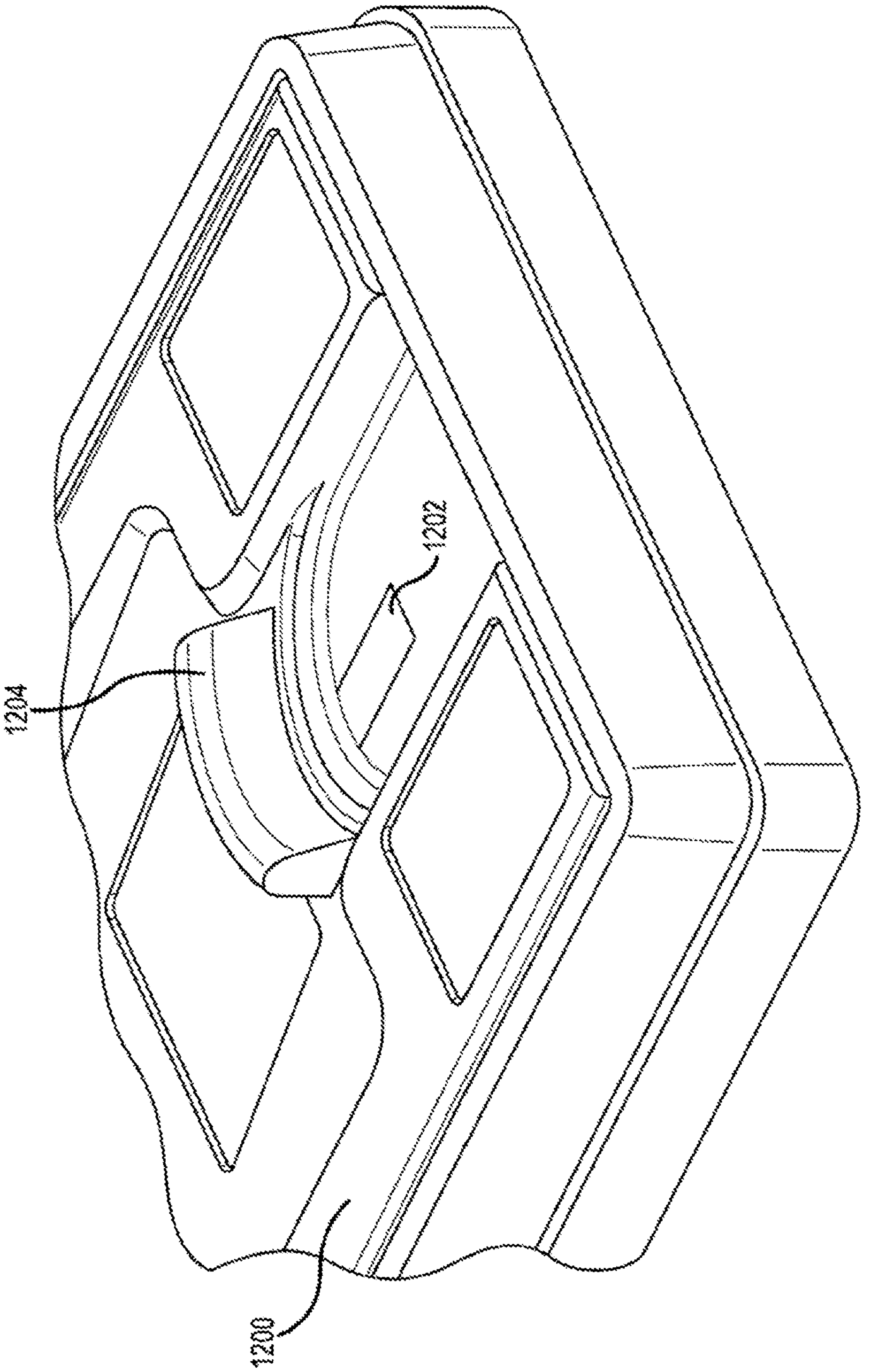
FIG. 12 depicts a support structure having a track or slot according to embodiments.

FIG. 11 depicts movement of a neck support 1100, such as the neck support used in the support structures described herein. Movement of neck support 1100 may be controlled by a motor 1102 coupled with a worm gear 1104. As the motor 1102 is actuated, the motor 1102 may rotate the worm gear 1104 such that it may pull a nut or gear 1106 coupled with the neck support 1100 toward the motor 1102 and/or push the gear 1106 away from the motor 1102. This causes the neck support 1100 to move between a contracted position and an extended position. The neck support 1100 may extend through a slot in a support structure such that the position may be adjusted. For example, FIG. 12 depicts a support structure 1200 having a track or slot 1202. A rod or extension piece of a neck support 1204 may extend through slot 1202, allowing the neck support 1204 to be moved along a length of the support structure 1200.

Figure 13:
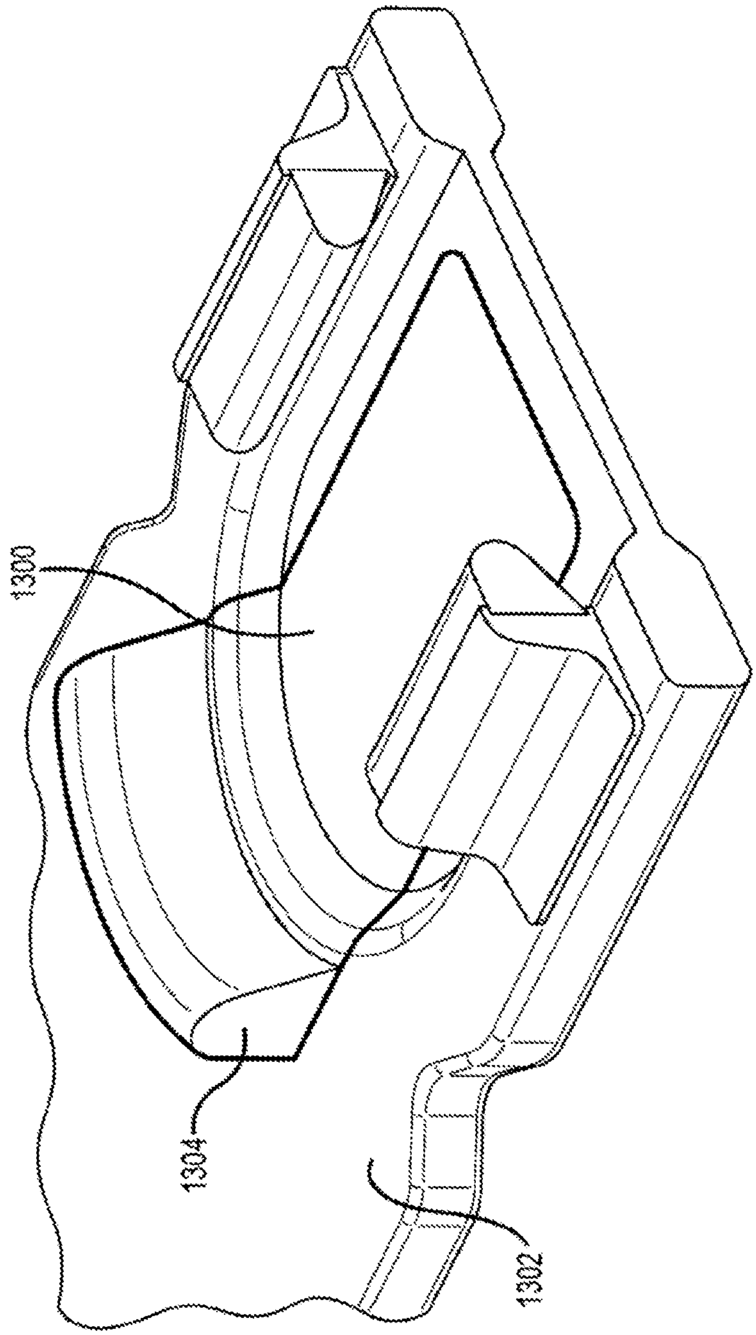
FIG. 13 shows a low friction shaped region of a support structure to restrain the head and/or neck in the correct Sniffing Position according to embodiments.

In some embodiments, a portion of a neck support may be positioned over a near frictionless track or surface, such as, but not limited to, a surface constructed of Polytetrafluoroethylene (PTFE). This allows the head and neck, while in the Sniffing Position, to slide vertically on an axis aligned or near aligned with the support structure. The neck support may have a small spring force to assist motion of the neck support and to counter any residual effects or effects due to gravity, and assures optimal placement of the patient in the Sniffing Position. Outline portion 1300 of support structure 1302 in FIG. 13 shows a low friction shaped region to restrain the head and/or neck in the correct Sniffing Position. This support structure 1302 allows movement in direction of the arrows while the neck support 1304 may be supplied with a spring force to help support the head and neck under forces, such as gravity.

FIG. 14 shows an embodiment of a support structure 1400 having an upper support with two pivot points. The use of multiple pivot or hinge points allows the patient's head to tilt back during the head and thorax up CPR procedure. By careful positioning of a neck support 1402, the head and neck now move such that the head and neck are extended and maintained in the correct sniffing position during the head and thorax up CPR procedure. Here, a first hinge point 1404 enables the upper support of the support structure 1400 to be pivoted and elevated. In some embodiments, the first hinge point 1404 may be aligned and/or co-incident with an axis of flexure of the patient, such as near the scapula. A second hinge point 1406 may be positioned higher up on the upper portion, such as near neck support 1402. The second hinge point 1406 allows the head to tilt back to position the patient in the sniffing position. In some embodiments, as shown in FIG. 14A, the second hinge point 1406 may be activated with a spring force, such as by using spring 1408, to cause a portion of the upper support to support the upper head. For example, the spring 1408 may help support the head, while still allowing some amount of downward tilt. In some embodiments, there may be a linkage, such as one or more arms, extendable arms, a chain linkage, a geared linkage, or other linkage mechanism to cause the portion of the support under the head to pivot down as the upper support lifts upwards. In this manner, a plane defined between the scapula and head of the patient may still be elevated at a desired angle 1410, such as between 10 and 45 degrees, while allowing the patient's head to tilt back, thus maintaining the patient in the sniffing position.

Figure 15A:
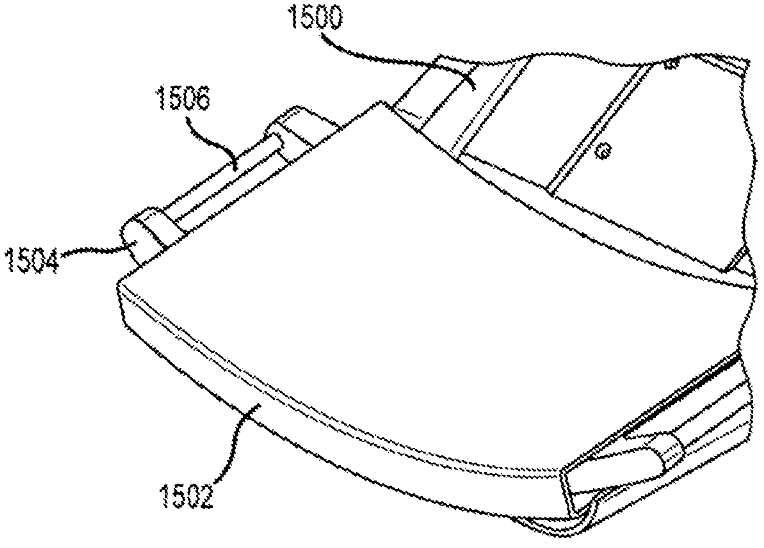
FIG. 15A shows a support structure having a sleeve for receiving a backplate of a chest compression device according to embodiments.
Figure 15B:
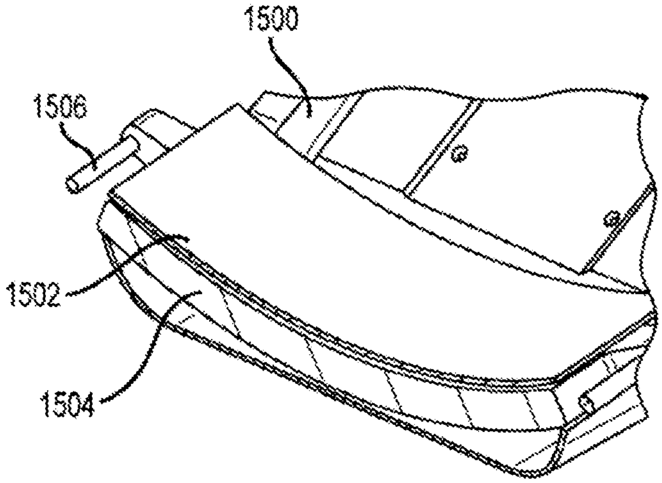
FIG. 15B shows a cross-section of the support structure of FIG. 15A with a backplate inserted within the sleeve according to embodiments.

FIGS. 15A-15G depict one embodiment of coupling a chest compression device to a support structure. For example, FIG. 15A shows a support structure 1500, such as the support structures described herein, having a sleeve 1502 or other receiving mechanism for receiving a backplate 1504 of a chest compression device. By utilizing a sleeve 1502, backplate 1504 may be slid into position within the support structure 1500 while a patient is already positioned on top of the support structure 1500. Thus, there is no need to move the patient or the support structure 1500 in order to couple a chest compression device. Backplate 1504 may be configured to be slidingly inserted within an interior of sleeve 1502. Backplate 1504 may also include one or more mounting features 1506. For example, a mounting feature 1506 may extend beyond sleeve 1502 on each side such that a corresponding mating feature of a chest compression device may be engaged to secure the chest compression device to the support structure. FIG. 15B shows a cross-section of sleeve 1502 with backplate 1504 inserted therein. The interior of sleeve 1502 may be contoured to match a contour of backplate 1504 such that backplate 1504 is firmly secured within sleeve 1502, as a chest compression device needs a solid surface to stabilize the device during chest compression delivery.

Figure 15C:
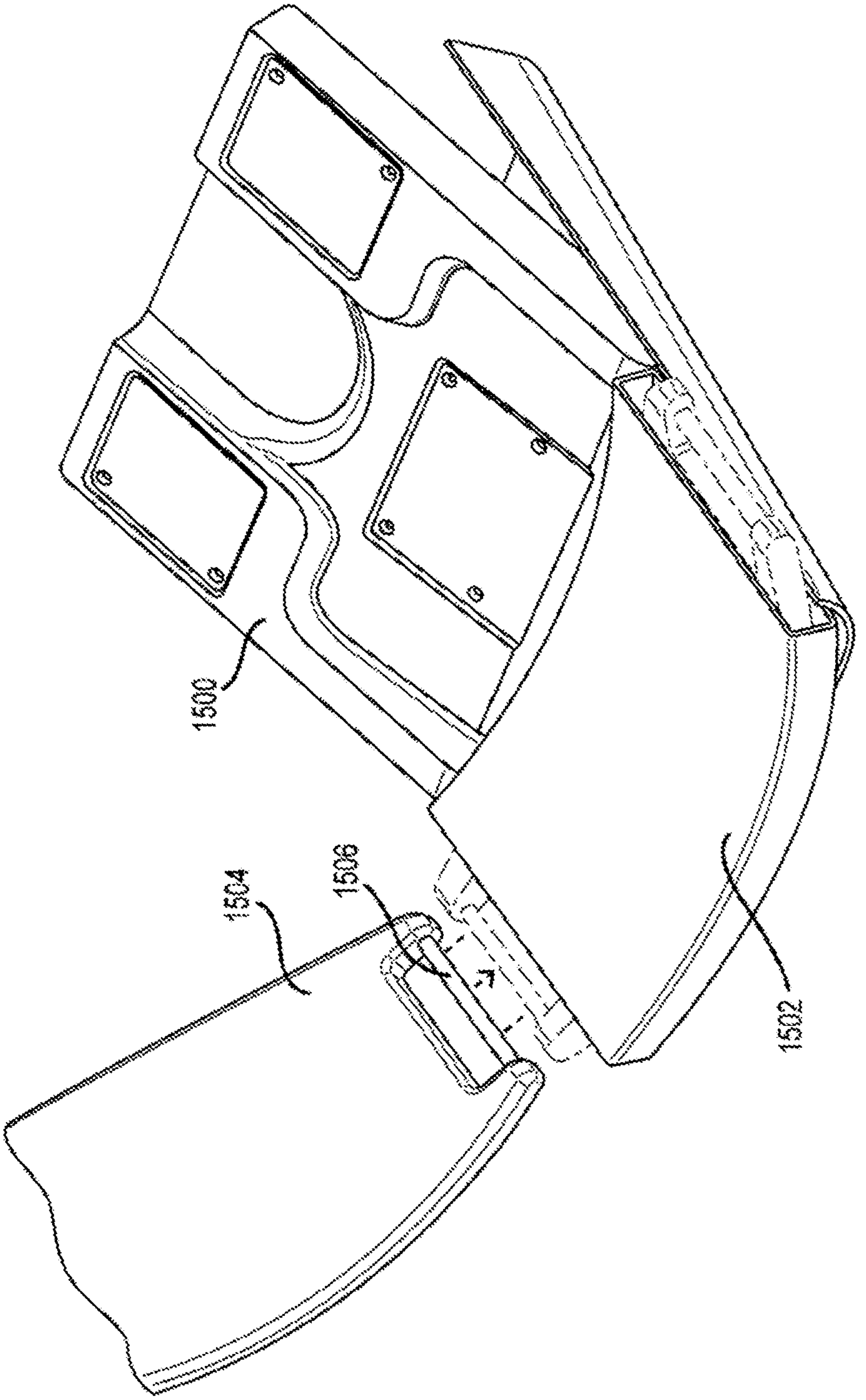
FIG. 15C depicts the support structure of FIG. 15A with the backplate being slid into the sleeve according to embodiments.
Figure 15D:
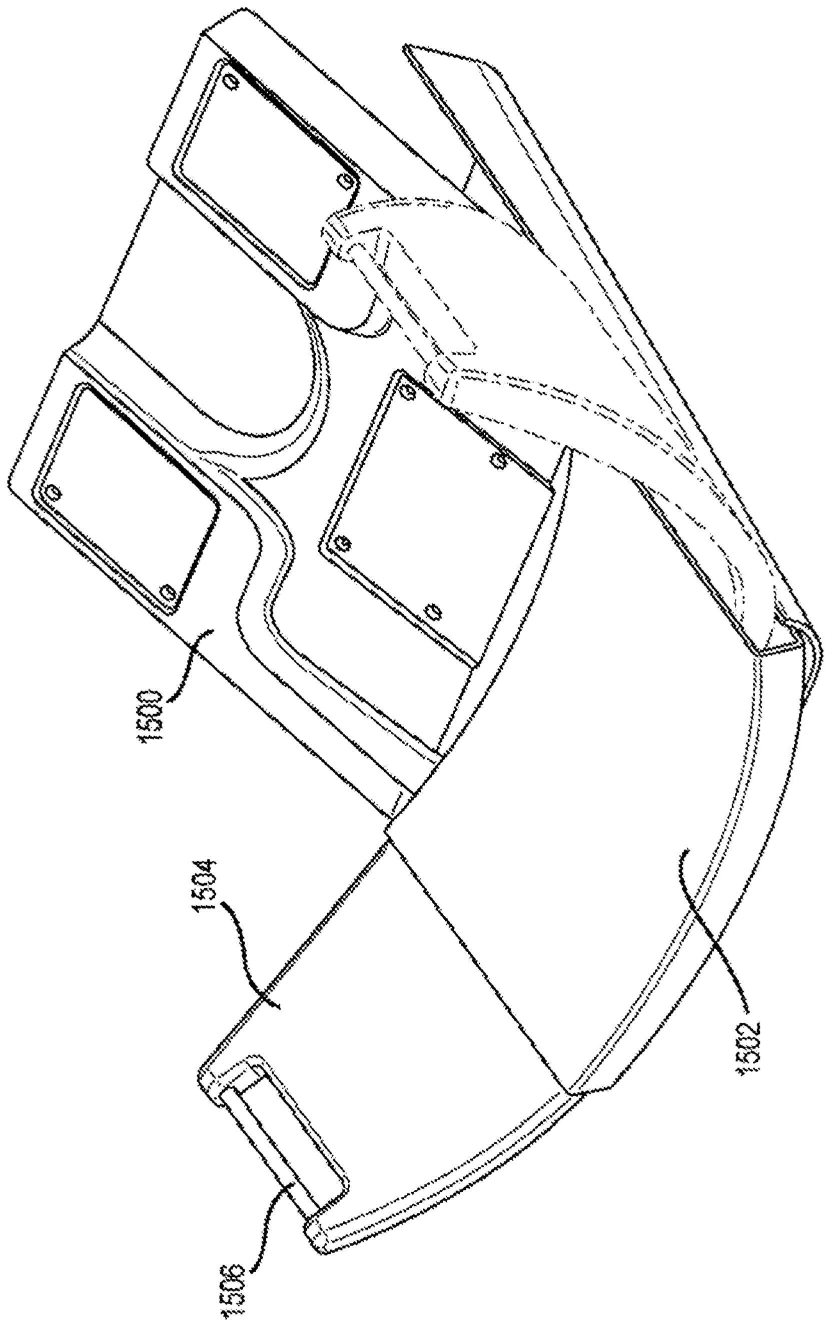
FIG. 15D shows the support structure of FIG. 15A with the backplate partially inserted within the sleeve according to embodiments.
Figure 15E:
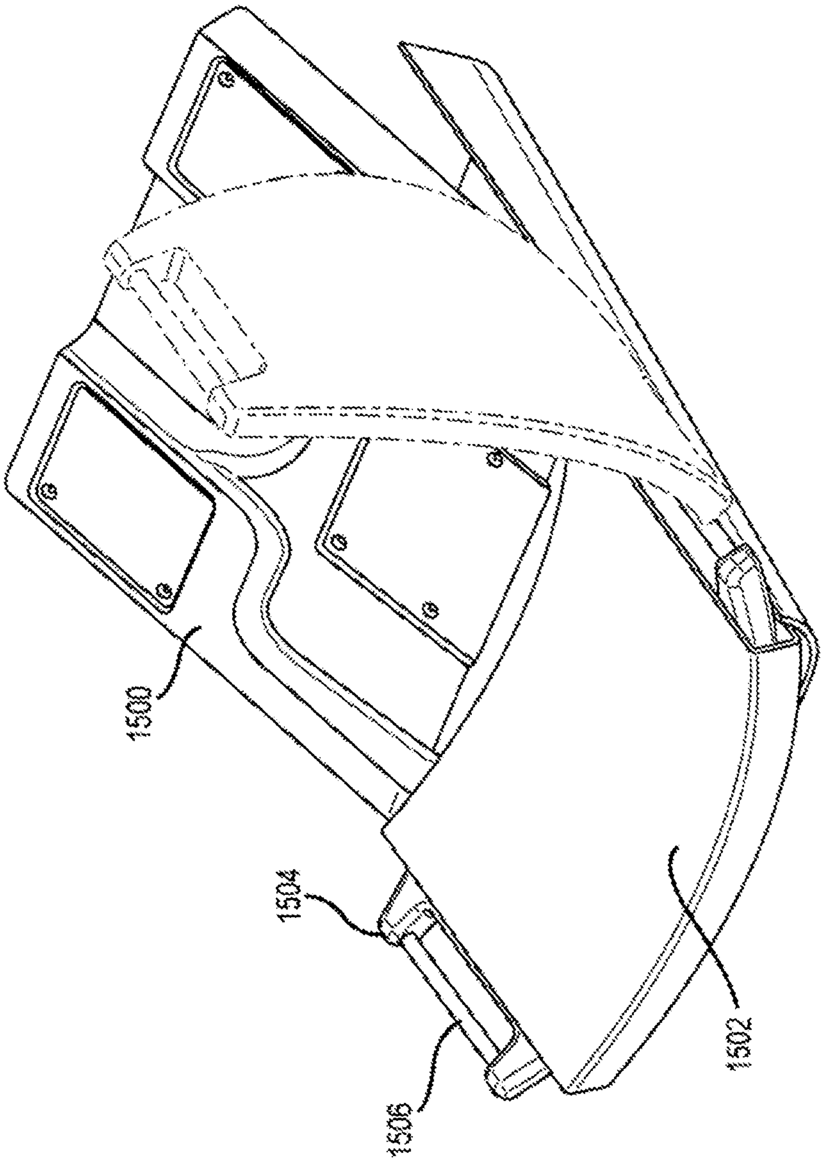
FIG. 15E shows the support structure of FIG. 15A with the backplate fully inserted into the sleeve according to embodiments.

FIG. 15C depicts backplate 1504 being slid into sleeve 1502. A first end of the backplate 1504 may be inserted into an opening of sleeve 1502 and pushed through until the mounting feature 1506 extend beyond the outer periphery of sleeve 1502. As noted above, the contour of the backplate 1504 and the interior of the sleeve 1502 may largely match, allowing the backplate 1504 to be easily pushed and/or pulled through the sleeve 1502. FIG. 15D shows the backplate 1504 partially inserted within the sleeve 1502. Backplate 1504 may be pushed further into sleeve 1502 or may be pulled out. For example, a user may grasp the mounting features 1506 to pull the backplate 1504 out of sleeve 1502. FIG. 15E shows backplate 1504 fully inserted into sleeve 1502. Here, a user may grasp the backplate 1504, such as by grasping one or more of mounting features 1506 and pull on one end of the backplate 1504 to remove the backplate from the sleeve 1502.

Figure 15F:
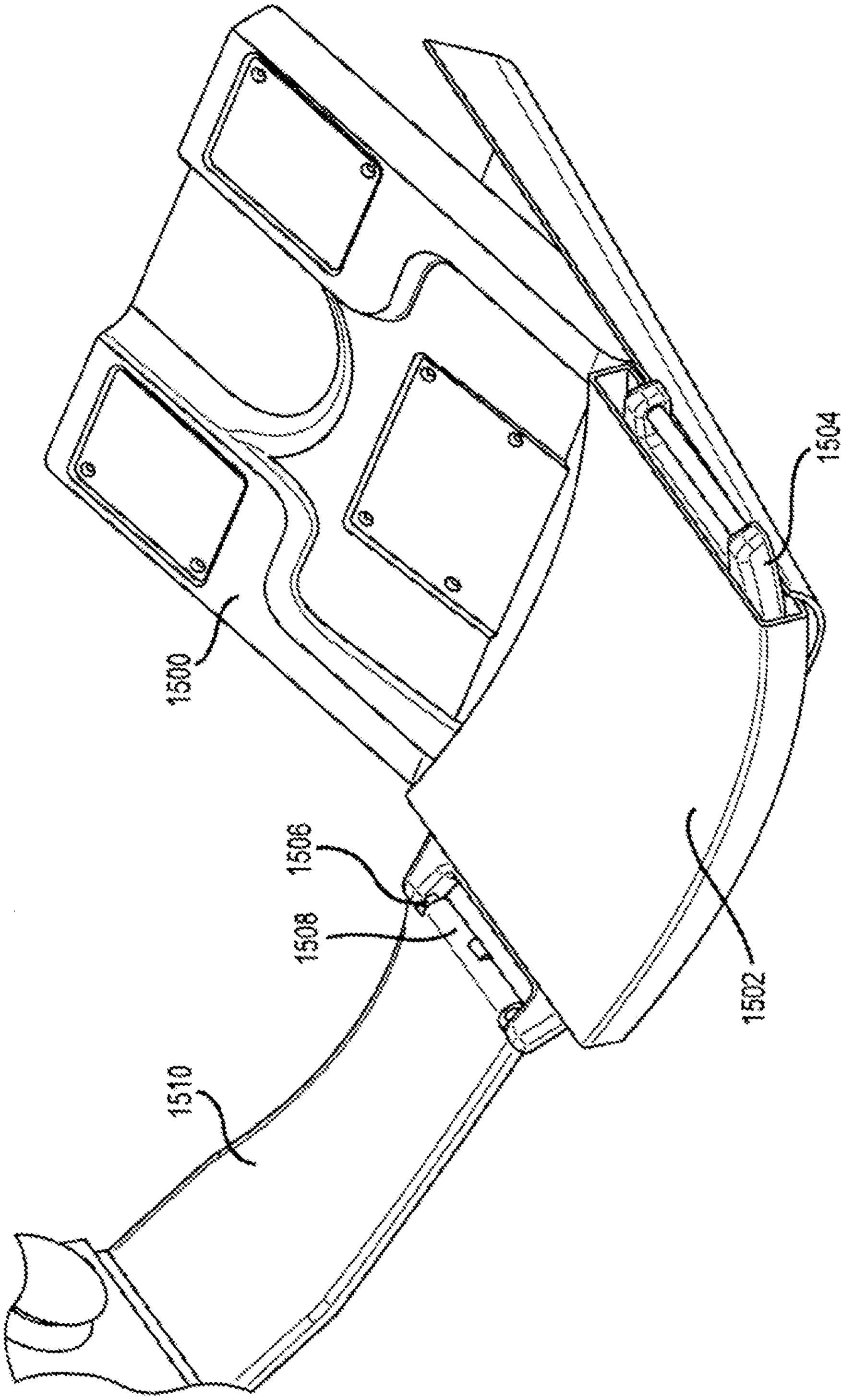
FIG. 15F depicts the support structure of FIG. 15A with a chest compression device being coupled with the support structure according to embodiments.
Figure 15G:
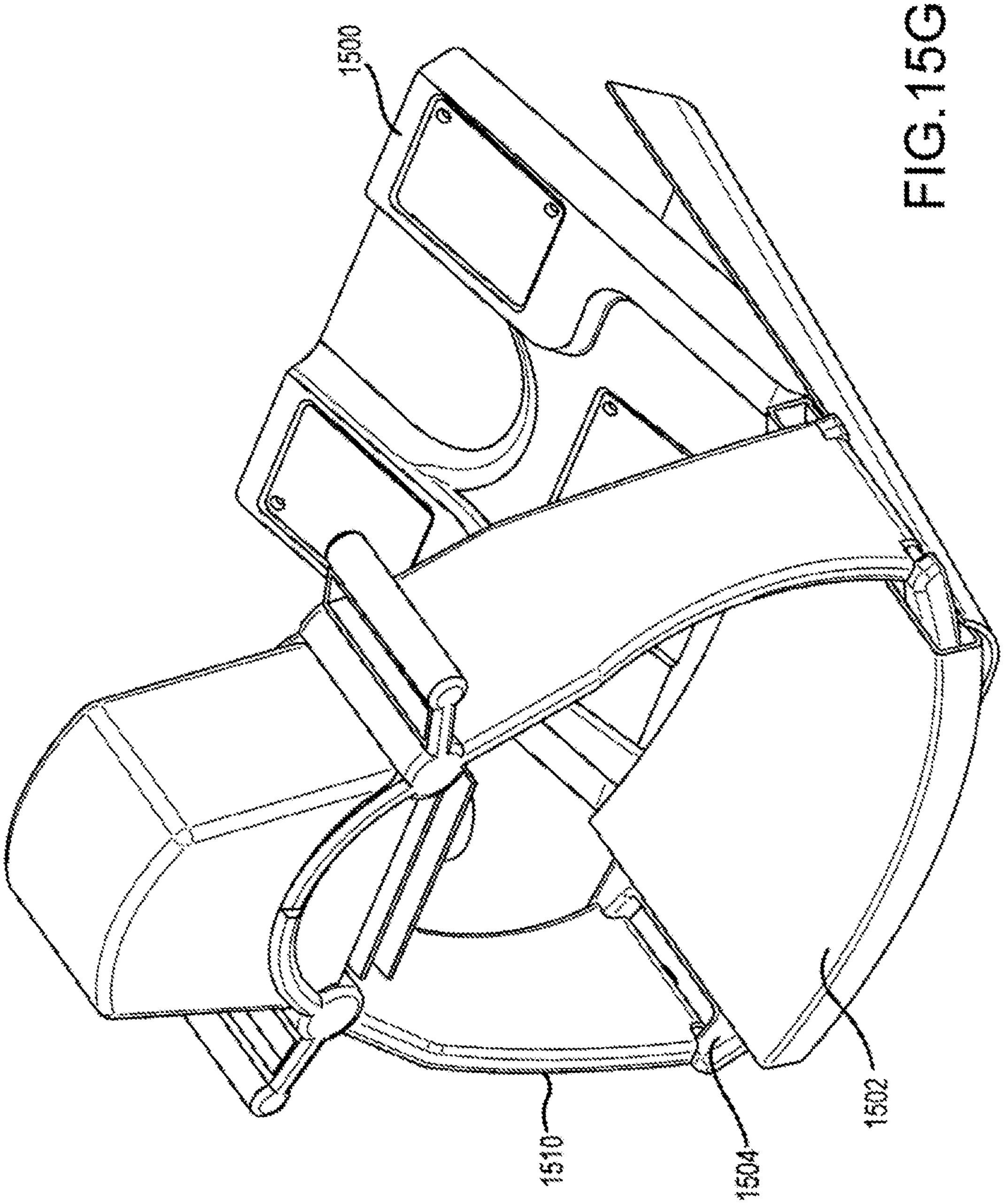
FIG. 15G shows the support structure of FIG. 15A with the chest compression device fully coupled with the support structure according to embodiments.

FIG. 15F depicts a chest compression-decompression device 1510 being coupled with the support structure 1500. Here, one end of the chest compression device 1510 includes a mating feature 1508 that may engage with the mounting feature 1506 to secure the chest compression-decompression device 1510 onto the support structure 1500. For example, mounting feature 1506 may be a bar or rod that is graspable by a clamp or jaws of mating feature 1508. In other embodiments, the mounting feature 1506 and/or mating feature 1508 may be clips, snap connectors, magnetic connectors, or the like. Oftentimes, pivotable connectors are useful such that the first end of the chest compression-decompression device 1510 may be coupled to the support structure 1500 prior to rotating the chest compression-decompression device 1510 over the patient's chest and coupling the second end of the chest compression-decompression device 1510. In other embodiments, both ends of the chest compression-decompression device 1510 may be coupled at the same, or nearly the same time. FIG. 15G shows chest compression-decompression device 1510 fully coupled with the support structure 1500. In this embodiment, the CPR device has a suction cup attached to the compression-decompression piston. Other means may also be used to link the CPR device to the skin during the decompression phase, including an adhesive material. As shown in FIG. 15G, mounting features 1506 and/or mating features 1508 may be positioned and aligned such that the chest compression-decompression device 1510 is coupled at an angle perpendicular to a surface of the sleeve 1502 and/or backplate 1504. In other words, the chest compression-decompression device 1510 is coupled to the support structure 1500 at a substantially perpendicular angle to a portion of the support structure 1500 that supports the heart and/or thorax of a patient. This ensures that any chest compressions delivered by the chest compression device are angled properly relative to the patient's chest and heart.

While shown here as a sleeve, it will be appreciated that some embodiments may utilize a channel or indentation to receive a backplate of a chest compression device. Other embodiments may include one or more fastening mechanisms, such as snaps, clamps, magnets, hook and loop fasteners, and the like to secure a backplate onto a support structure. In some embodiments, a backplate may be permanently built into the support structure. For example, a thorax-supporting or lower portion of a support structure may be shaped to match a patient's back and may include one or more mounting features that may engage or be engaged with corresponding mounting features of a chest compression device.

Figure 16A:
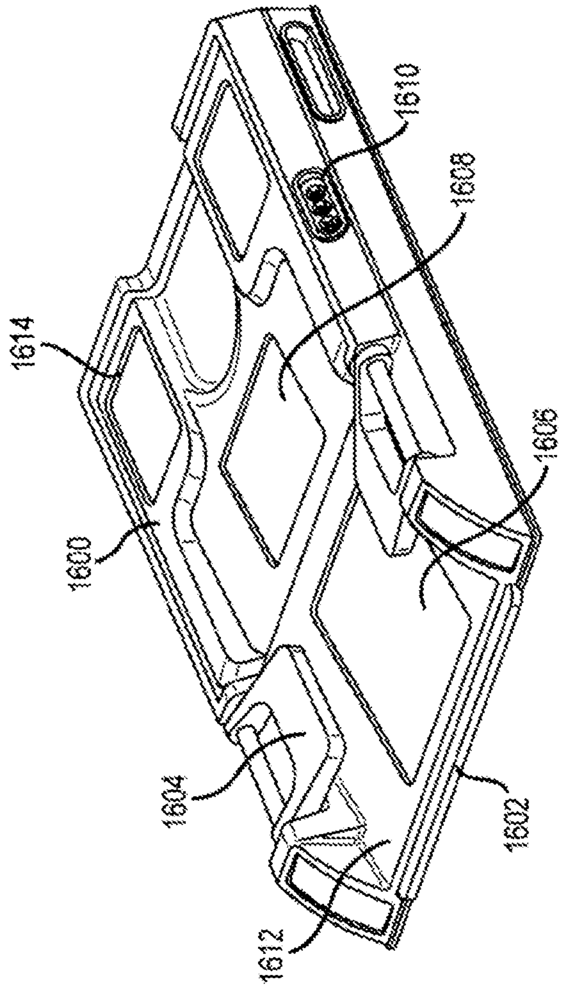
FIG. 16A shows a support structure in a closed position according to embodiments.

FIGS. 16A-16D depict one embodiment of a support structure 1600 having stabilizing elements These stabilizing elements ensure that the patient is maintained in a proper position throughout the administration of head and thorax up CPR. FIG. 16A shows support structure 1600 in a closed position. An underbody stabilizer 1602 may be slid within a recess of the support structure 1600 for storage. The underbody stabilizer 1602 may be configured to support a lower body of a patient. One or more armpit stabilizers 1604 may be included on the support structure 1600. Armpit stabilizers 1604 may be pivoted to be positioned under a patient's underarms and my help prevent the patient sliding down the support structure 1600 due to effects from gravity and/or the administration of chest compressions. In the closed position, armpit stabilizers 1604 may be folded toward a surface of the support structure 1600. In some embodiments, armpit stabilizers 1604 may include mounting features, such as those used to couple a chest compression device with the support structure 1600. In some embodiments, the stabilizer could be extended and modified to include handles so that the entire structure (not shown) could be used as a transport device or stretcher so the patient could be moved with ongoing CPR from one location to another.

Support structure 1600 may also include non-slip pads 1606 and 1608 that further help maintain the patient in the correct position without slipping. Non-slip pad 1606 may be positioned on a lower or thorax support 1612, and non-slip pad 1608 may be positioned on an upper or head and neck support 1614. While not shown, it will be appreciated that a neck support, such as described elsewhere herein, may be included in support structure 1600. Support structure 1600 may also include motor controls 1610. Motor controls 1610 may allow a user to control a motor to adjust an angle of elevation and/or height of the lower support 1612 and/or upper support 1614. For example, an up button may raise the elevation angle, while a down button may lower the elevation angle. A stop button may be included to stop the motor at a desired height, such as an intermediate height between fully elevated and supine. It will be appreciated that motor controls 1610 may include other features, and may be coupled with a computing device and/or sensors that may further adjust an angle of elevation and/or a height of the lower support 1612 and/or the upper support 1614 based on factors such as a type of CPR, a type of ITP regulation, a patient's body size, measurements from flow and pressure sensors, and/or other factors.

Figure 16B:
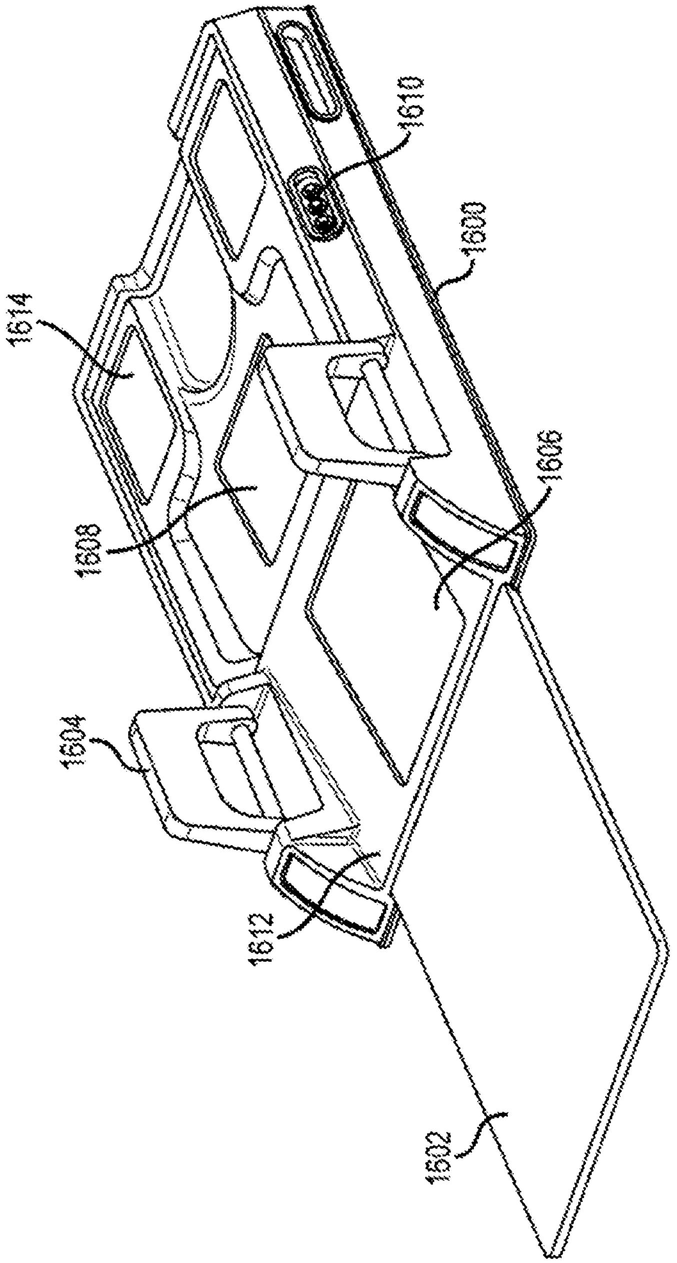
FIG. 16B shows the support structure of FIG. 16A in an expanded supine position according to embodiments.
Figure 16C:
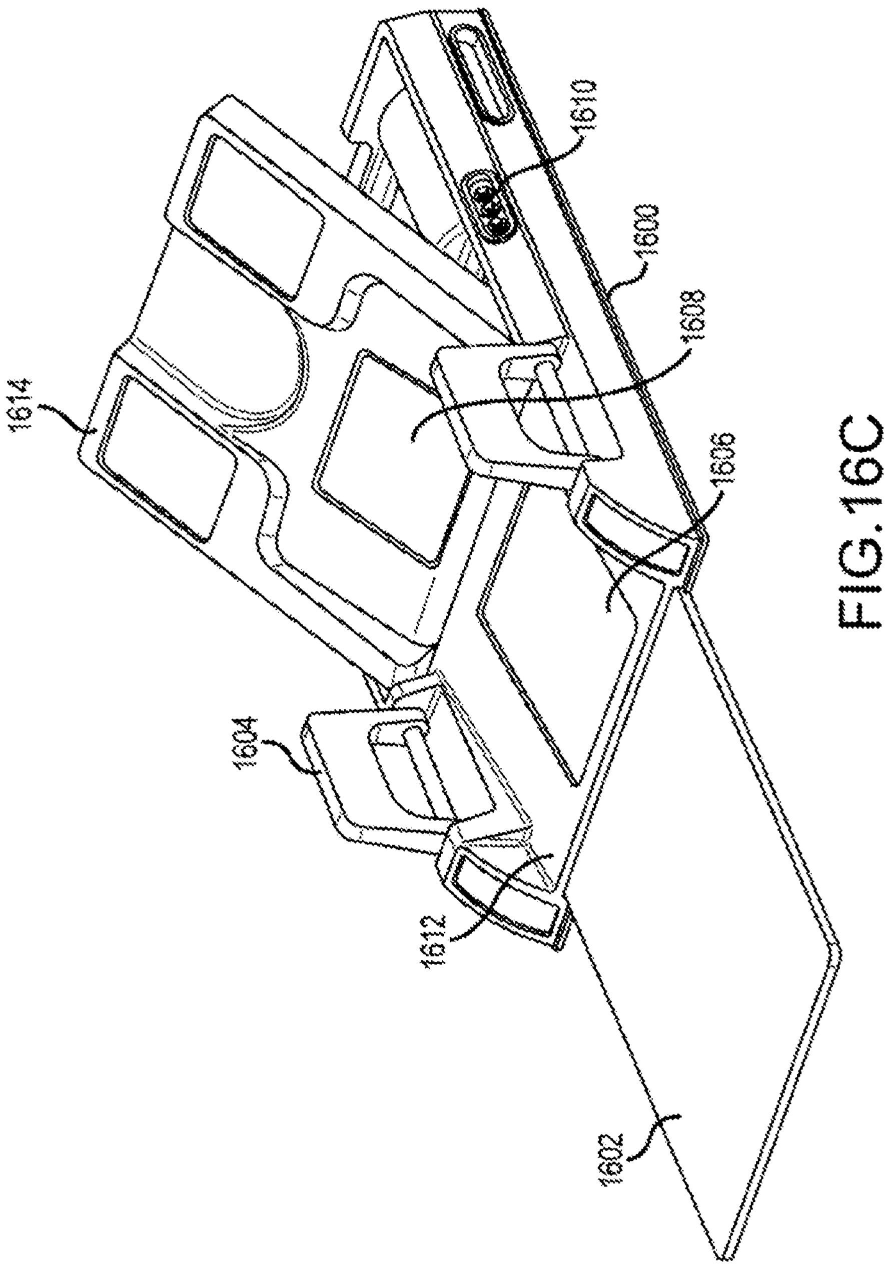
FIG. 16C shows the support structure of FIG. 16A in an expanded elevated position according to embodiments.
Figure 16D:
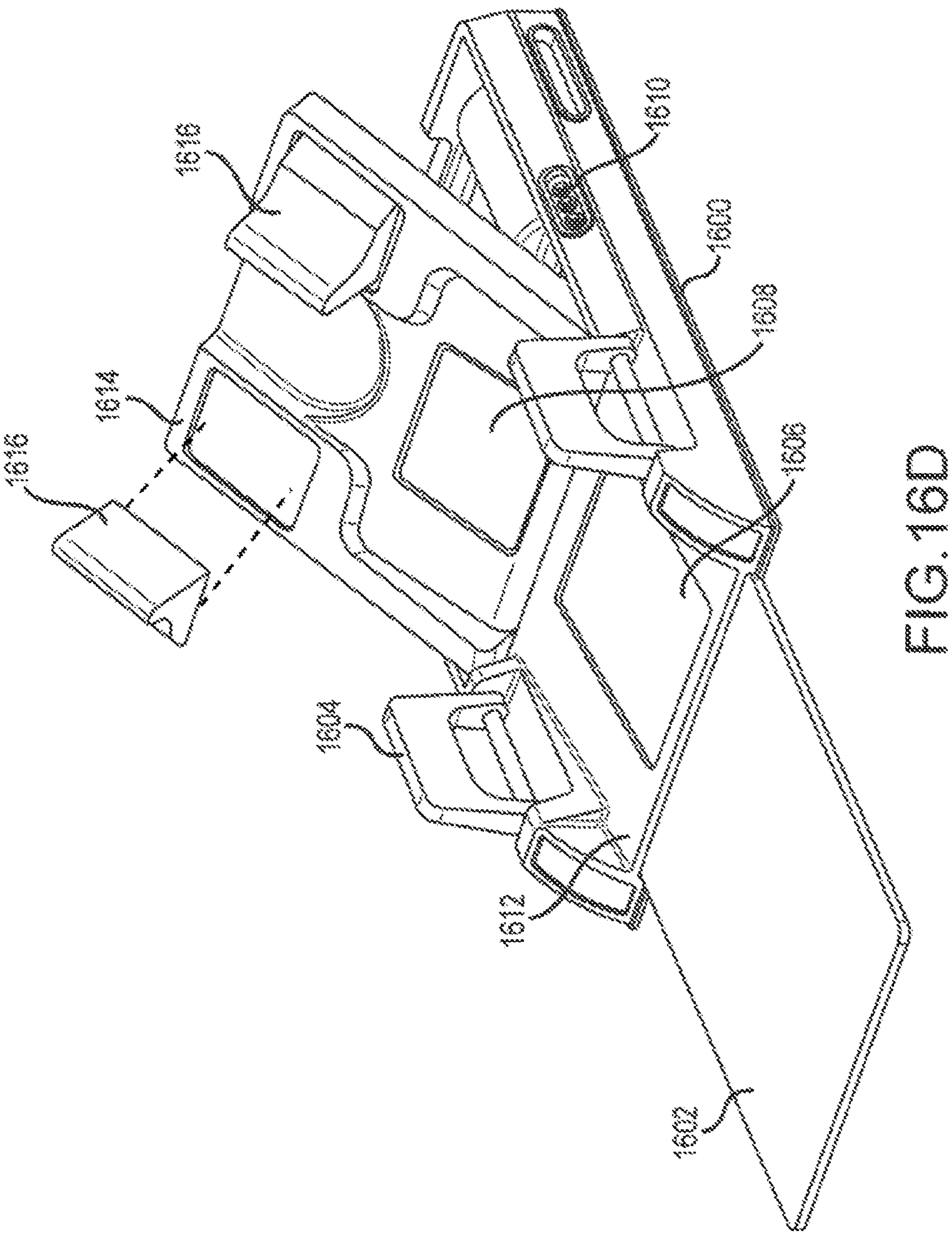
FIG. 16D shows the support structure of FIG. 16A coupled with head stabilizers according to embodiments.

FIG. 16B depicts support structure 1600 in an extended, but relatively flat position. Here, Underbody stabilizer 1602 is extended from support structure 1600 such that at least a portion of a lower body of the patient may be supported by underbody stabilizer 1602. Armpit stabilizers 1604 may be rotated into alignment with a patient's underarms such that a portion of the armpit stabilizers 1604 closest to the head may engage the patient's underarms to maintain the patient in the correct position during administration of CPR. In some embodiments, the armpit stabilizers 1604 may be mounted to a lateral expansion element that may be adjusted to accommodate different patient sizes. FIG. 16C shows the support structure 1600 in an extended and elevated position. Here, the upper support 1614 and/or lower support 1612 may be elevated above a horizontal plane, such as described herein. For example, upper support 1614 may be elevated by actuation of the motor (not shown) due to a user interacting with motor controls 1610. The elevation may be between about 15° and 45° above a substantially horizontal plane in which the patient's lower body is positioned. In some embodiments, the support structure 1600 may include one or more head stabilizers 1616. The head stabilizers 1616 may be removably coupled with the upper support 1614, such as using a hook and loop fastener, magnetic coupling, a snap connector, a reusable adhesive, and/or other removable fastening techniques. In some embodiments, the head stabilizers 1616 may be coupled after a patient has been positioned on support structure 1600. This allows the spacing between the head stabilizers 1616 to be customized such that support structure 1600 may be adapted to fit any size of patient.

Figure 17:
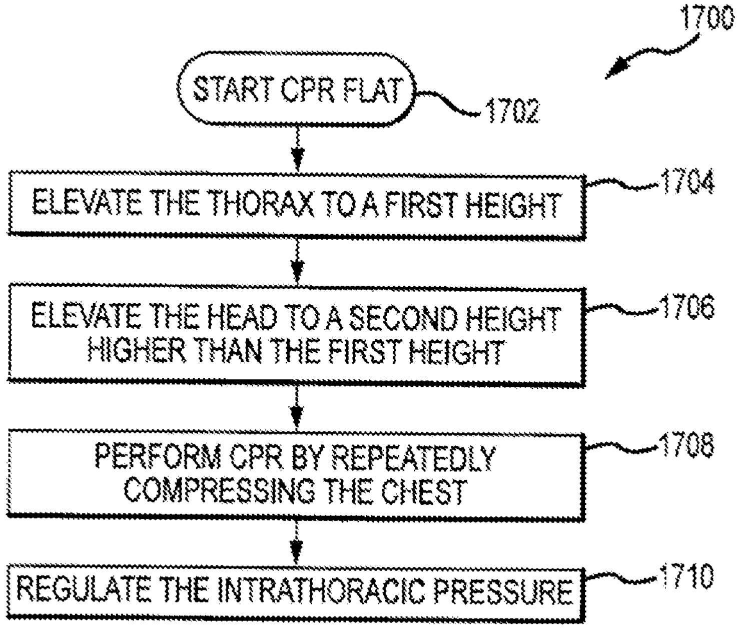
FIG. 17 is a flowchart of a process for administering CPR to a patient in a head and thorax up position according to embodiments.

FIG. 17 depicts a process 1700 for performing CPR. The process 1700 typically begins with the patient flat, and CPR is started as soon as possible. CPR is performed flat initially at block 1702. Next, the thorax of an individual is elevated to a first height relative to a lower body of the individual at block 1704. The first height may be between about 3 cm and 8 cm, typically about 4 cm. At block 1706, the head of the individual may be elevated to a second height relative to the lower body of the individual. The second height may be greater than the first height. The elevation time can vary, and can typically take between 1 second and 30 seconds, depending on the method used to elevate the patient. For example, the second height may be between about 10 cm and 30 cm, typically about 15 cm. CPR may be performed by repeatedly compressing the chest at block 1708, whereby elevation of the thorax and elevation of the head to a greater height than the thorax assists to lower intracranial pressure and increase cerebral perfusion pressure during the performance of CPR. In some embodiments, the CPR may be C-CPR, while in other embodiments, the CPR may be ACD+CPR as described herein. The intrathoracic pressure of the individual may be regulated while performing CPR at block 1710. This may be done, for example, by using an ITD device. After successful resuscitation, the patient can stay with the head and thorax up or the head and thorax can be lowered as clinically indicated.

Figure 18:
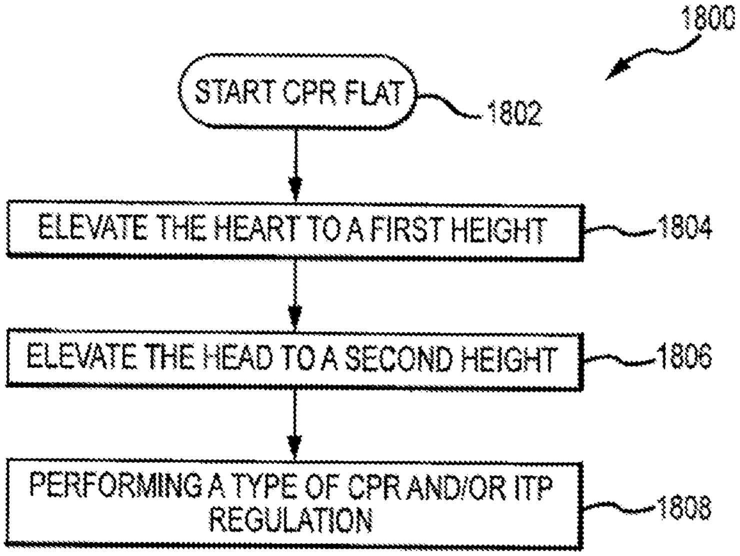
FIG. 18 is a flowchart depicting a process for performing CPR according to embodiments.

FIG. 18 depicts a process 1800 for performing CPR. Process 1800 may utilize a support structure similar to support structure 500. The process 1800 typically begins with the patient flat, and CPR is started as soon as possible. CPR is performed flat initially at block 1802. At block 1804, process 1800 may include elevating the heart of an individual to a first height relative to a lower body of the individual. The lower body may be in a substantially horizontal plane. At block 1806, the head of the individual may be elevated to a second height relative to the lower body of the individual, with the second height being greater than the first height. In some embodiments, the first height is between about 3 cm and 8 cm above the substantially horizontal plane and the second height is between about 10 cm and 30 cm above the substantially horizontal plane. In some embodiments, the heart and the head may be elevated at a same angle relative to the substantially horizontal plane. In other embodiments, the heart is elevated to a first angle relative to the substantially horizontal plane and the head is elevated to a second angle relative to the substantially horizontal plane, with the second angle being greater than the first angle. For example, the first angle may be between about 5° and 15° relative to the substantially horizontal plane and the second angle may be between about 15° and 45° relative to the substantially horizontal plane.

One or both of a type of CPR or a type of intrathoracic pressure regulation may be performed when the patient is flat and then while elevating the heart and the head at block 1808. The first height and the second height may be determined based on one or both of the type of CPR or the type of intrathoracic pressure regulation. In some embodiments, the patient's head will be maintained continuously in the "sniffing position" when flat and elevated. Elevation of the thorax and elevation of the head to a greater height than the thorax assists to 1) lower intracranial pressure and increase cerebral perfusion pressure during the performance of CPR and 2) lower right atrial pressure and increase coronary perfusion pressure during the performance of CPR. In some embodiments, the process 1800 may also include coupling one or both of a device for regulating intrathoracic pressure or a CPR assist device to a structure supporting one or both of the head and the heart.

Figure 19:
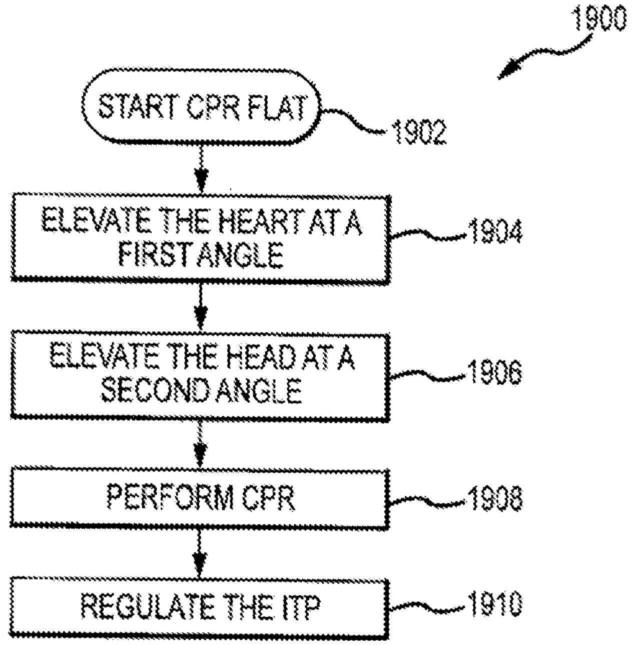
FIG. 19 is a flowchart depicting a process for performing CPR according to embodiments.

FIG. 19 depicts a process 1900 for performing CPR. The process 1900 typically begins with the patient flat, and CPR is started as soon as possible. CPR is performed flat initially at block 1902. At block 1904, the heart of an individual may be elevated at a first angle relative to a lower body of the individual. The lower body may be in a substantially horizontal plane. At block 1906, the head of the individual may be elevated at a second angle relative to the lower body such that the head is elevated above the heart. In some embodiments, the first angle may be between about 5° and 15° relative to the substantially horizontal plane and the second angle may be between about 15° and 45° relative to the substantially horizontal plane. These angles may result in the heart being elevated between about 3 cm and 8 cm relative to the substantially horizontal plane and the head being elevated between about 10 cm and 30 cm relative to the substantially horizontal plane. Elevating the heart and elevating the head may include adjusting of a surface that supports one or both of the thorax/heart or the head.

CPR may be performed by repeatedly compressing the chest at block 1908, whereby elevation of the heart and elevation of the head to a greater height than the thorax assists to 1) lower intracranial pressure and increase cerebral perfusion pressure during the performance of CPR and 2) lower right atrial pressure and increase coronary perfusion pressure during the performance of CPR. Performing CPR may include performing one or more of standard conventional CPR, stutter CPR, an active compression decompression CPR; a thoracic band with phased CPR; an automated CPR using a device that performs CPR according to an algorithm. At block 1910, the intrathoracic pressure of the individual may be regulated while performing CPR. In some embodiments, the first angle and the second angle may be determined based on a type of CPR performed and a type of intrathoracic pressure regulation. In some embodiments, process 1900 may include interfacing a chest compression device to the chest of the individual and/or interfacing an impedance threshold device with the airway of the individual to create a negative pressure within the chest during a relaxation phase of CPR.

The elevation of the head alone lowers ICP and thus will result in higher cerebral perfusion pressure compared with CPR administered to a flat or supine patient. Elevation of the head and thorax lowers ICP and shifts the distribution of blood in the lung fields and in the right heart such that there is a net greater blood flow across the lungs because with elevation of the thorax the upper lung fields are less congested than when flat, allowing for greater gas exchange and less resistance to blood flow. This increases blood flow to the brain and the heart. Both elevating only a patient's head, as well as elevating both the head and thorax, are more effective than tilting the whole body upwards because over time with the whole body tilted, blood pools in the lower body, which results in there being less blood to circulation to the brain and heart over time. Elevation of the head alone, head and thorax, or whole body, are each better than flat CPR, since with flat CPR the 1) pulmonary vascular resistance is higher and thus there is a decreased net blood flow from the right heart to the left heart and 2) there are simultaneous compression waves to the brain via the veins on one side and the arteries on the other. Any time the head is elevated, it is necessary to ensure there is enough of a pressure head to perfuse the elevated brain. Conventional CPR does not provide adequate enough perfusion, and instead intrathoracic pressure regulators like the ITD are often needed to increase circulation and thus provide sufficient perfusion to drive blood upwards, against gravity, to the brain, when CPR is performed in the head up position, regardless of whether it is whole body upward tilt, head up alone or head and thorax elevation as described herein.

Additional information and techniques related to head up CPR may be found in Debaty G, et al. "Tilting for perfusion: Head-up position during cardiopulmonary resuscitation improves brain flow in a porcine model of cardiac arrest." *Resuscitation.* 2015: 87: 38-43. Print., the entire contents of which is hereby incorporated by reference. Further reference may be made to Lurie, Keith G. "The Physiology of Cardiopulmonary Resuscitation," which is attached to this application as Appendix A, the entire contents of which are hereby incorporated by reference. Moreover, any of the techniques and methods described therein may be used in conjunction with the systems and methods of the present invention.

EXAMPLE

An experiment was performed to determine whether cerebral and coronary perfusion pressures will remain elevated over 20 minutes of CPR with the head elevated at 15 cm and the thorax elevated at 4 cm compared with the supine position. A trial using female farm pigs was performed, modeling prolonged CPR for head-up versus head flat during both C-CPR and ACD+ITD CPR. A porcine model was used and focus was placed primarily on observing the impact of the position of the head on cerebral perfusion pressure and ICP.

Approval for the study was obtained from the Institutional Animal Care Committee of the Minneapolis Medical Research Foundation, the research foundation associated with Hennepin County Medical Center in Minneapolis, MN. Animal care was compliant with the National Research Council's 1996 Guidelines for the Care and Use of Laboratory Animals, and a certified and licensed veterinarian assured protocol performance was in compliance with these guidelines. This research team is qualified and has extensive combined experience performing CPR research in Yorkshire female farm pigs.

The animals were fasted overnight. Each animal received intramuscular ketamine (10 mL of 100 mg/mL) for initial sedation, and were then transferred from their holding pen to the surgical suite and intubated with a 7-8 French endotracheal tube. Anesthesia with inhaled isoflurane at 0.8%-1.2% was then provided, and animals were ventilated with room air using a ventilator with tidal volume 10 mL/kg. Arterial blood gases were obtained at baseline. The respiratory rate was adjusted to keep oxygen saturation above 92% and end tidal carbon dioxide ($ETCO_2$) between 36 and 40 mmHg. Central aortic blood pressures were recorded continuously with a micromanometer-tipped catheter placed in the descending thoracic aorta via femoral cannulation at the level of the diaphragm. A second Millar catheter was placed in the right external jugular vein and advanced into the superior vena cava, approximately 2 cm above the right atrium for measurement of right atrial (RA) pressure. Carotid artery blood flows were obtained by placing an ultrasound flow probe in the left common carotid artery for measurement of blood flow (ml Intracranial pressure (ICP) was measured by creating a burr hole in the skull, and then insertion of a Millar catheter into the parietal lobe. All animals received a 100 units/kg bolus of heparin intravenously and received a normal saline bolus for a goal right atrial pressure of 3-5 mmHg. $ETCO_2$ and oxygen saturation were recorded with a $CO_2$SMO Plus®.

Continuous data including electrocardiographic monitoring, aortic pressure, RA pressure, ICP, carotid blood flow, $ETCO_2$ was monitored and recorded. Cerebral perfusion pressure (CerPP) was calculated as the difference between mean aortic pressure and mean ICP. Coronary perfusion pressure (CPP) was calculated as the difference between aortic pressure and RA pressure during the decompression phase of CPR. All data was stored using a computer data analysis program.

When the preparatory phase was complete, ventricular fibrillation (VF) was induced with delivery of direct intracardiac electrical current from a temporary pacing wire placed in the right ventricle. Standard CPR and ACD+ITD CPR were performed with a pneumatically driven automatic piston device. Standard CPR was performed with uninterrupted compressions at 100 compressions/min, with a 50% duty cycle and compression depth of 25% of anteroposterior chest diameter. During standard CPR, the chest wall was allowed to recoil passively. ACD+ITD CPR was also performed at a rate of 100 per minute, and the chest was pulled upwards after each compression with a suction cup on the skin at a decompression force of approximately 20 lb and an ITD was placed at the end of the endotracheal tube. If randomization called for head and thorax elevation CPR (HUP), the head and shoulders of the animal were elevated 15 cm on a table specially built to bend and provide CPR at different angles (FIG. 1) while the thorax at the level of the heart was elevated 4 cm. While moving the animal into the head and thorax elevated position, CPR was able to be continued. Positive pressure ventilation with supplemental oxygen at a flow of 10 L $min^{-1}$ were delivered manually. Tidal volume was kept at 10 mL/kg and respiratory rate at 10 breaths per minute. If the animal was noted to gasp during the resuscitation, time at first gasp was recorded, and then succinylcholine was administered to facilitate ventilation after the third gasp.

After 8 minutes of untreated ventricular fibrillation 2 minutes of automated CPR was performed in the 0° supine (SUP) position. Pigs were then randomized to CPR with 30° head and thorax up (HUP) versus SUP without interruption for 20 minutes. In group A, all pigs received C-CPR, randomized to either HUP or SUP, and in Group B, all pigs received ACD+ITD CPR, again randomized to either HUP or SUP. After 22 total minutes of CPR, all pigs were then placed in the supine position and defibrillated with up to three 275 J biphasic shocks. Epinephrine (0.5 mg) was also given during the post CPR resuscitation. Animals were then sacrificed with a 10 ml injection of saturated potassium chloride.

The estimated the mean cerebral perfusion pressure was 28 mmHg in the HUP ACD+ITD group and 19 mmHg in the SUP ACD+ITD group, with a standard deviation of 8. Assuming an alpha level of 0.05 and 80% power, it was calculated that roughly 13 animals per group were needed to detect a 47% difference.

Descriptive statistics were used as appropriate. An unpaired t-test was used for the primary outcome comparing CerPP between HUP and SUP CPR. This was done both for the ACD+ITD CPR group and also the C-CPR group at 22 minutes. All statistical tests were two-sided, and a p value of less than 0.05 was required to reject the null hypothesis. Data are expressed as mean±standard error of mean (SEM). Secondary outcomes of coronary perfusion pressure (CPP, mmHg), time to first gasp (seconds), and return of spontaneous circulation (ROSC) were also recorded and analyzed.

RESULTS

Group A:

Table 1A below summarizes the results for group A.

TABLE 1A

Group of Conventional Cardiopulmonary Resuscitation (CPR) (Mean ± SEM)

| | Head-up | | Supine | | |
|---|---|---|---|---|---|
| | BL | 20 minutes | BL | 20 minutes | P value |
| SBP | 99 ± 4 | 20 ± 2 | 91 ± 7 | 19 ± 2 | 0.687 |
| DBP | 68 ± 3 | 11 ± 2 | 59 ± 5 | 13 ± 2 | 0.665 |
| ICP max | 25 ± 1 | 14 ± 1 | 27 ± 1 | 23 ± 1 | <0.001* |
| ICP min | 20 ± 1 | 12 ± 1 | 21 ± 1 | 20 ± 1 | <0.001* |
| RA max | 9 ± 1 | 28 ± 5 | 11 ± 1 | 26 ± 2 | 0.694 |
| RA min | 2 ± 1 | 5 ± 1 | 3 ± 1 | 9 ± 1 | 0.026* |
| ITP max | 3.3 ± 0.2 | 0.9 ± 0.2 | 3.2 ± 0.2 | 1.3 ± 0.3 | 0.229 |
| ITP min | 2.4 ± 0.1 | 0.2 ± 0.1 | 2.3 ± 0.2 | −0.1 ± 0.1 | 0.044* |
| EtCO2 | 38 ± 0 | 5 ± 1 | 38 ± 1 | 4 ± 1 | 0.123 |
| CBF max | 598 ± 25 | 85 ± 33 | 529 ± 28 | 28 ± 11 | 0.132 |
| CBF min | 183 ± 29 | −70 ± 22 | 94 ± 43 | −19 ± 9 | 0.052 |
| CPP calc | 65 ± 3 | 6 ± 2 | 56 ± 5 | 3 ± 2 | 0.283 |
| CerPP calc | 59 ± 3 | 6 ± 3 | 60 ± 6 | −5 ± 3 | 0.016* |

DBP = diastolic blood pressure

Both HUP and SUP cerebral perfusion pressures were similar at baseline. Seven pigs were randomized to each group. For the primary outcome, after 22 minutes of C-CPR, CerPP in the HUP group was significantly higher than the SUP group (6±3 mmHg versus −5±3 mmHg, p=0.016).

Elevation of the head and shoulders resulted in a consistent reduction in decompression phase ICP during CPR compared with the supine controls. Further, the decompression phase right atrial pressure was consistently lower in the HUP pigs, perhaps because the thorax itself was slightly elevated. Coronary perfusion pressure was 6±2 mmHg in the HUP group and 3±2 mmHg in the SUP group at 20 minutes (p=0.283) (Table 1A). None of the pigs treated with C-CPR, regardless of the position of the head, could be resuscitated after 22 minutes of CPR.

Time to first gasp was 306±79 seconds in the HUP group and 308±37 in the SUP group (p=0.975). Of note, 3 animals in the HUP group and 2 animals in the SUP group were not observed to gasp during the resuscitation.

Group B:

Table 1B below summarizes the results for group B.

TABLE 1B

Group of ACD ± ITD-CPR (Mean ± SEM)

| | Head-up | | Supine | | |
|---|---|---|---|---|---|
| | BL | 20 minutes | BL | 20 minutes | P value |
| SBP | 106 ± 5 | 70 ± 9 | 108 ± 3 | 47 ± 5 | 0.036* |
| DBP | 68 ± 5 | 40 ± 6 | 70 ± 2 | 28 ± 4 | 0.119 |
| ICP max | 26 ± 2 | 20 ± 2 | 24 ± 1 | 26 ± 2 | 0.019* |
| ICP min | 20 ± 2 | 15 ± 1 | 19 ± 1 | 20 ± 1 | <0.001* |
| RA max | 8 ± 2 | 59 ± 13 | 8 ± 1 | 56 ± 7 | 0.837 |
| RA min | 1 ± 1 | 4 ± 1 | 0 ± 1 | 8 ± 1 | 0.026* |
| ITP max | 3.4 ± 0.2 | 0.6 ± 0.3 | 3.3 ± 0.2 | 0.6 ± 0.2 | 0.999 |
| ITP min | 2.5 ± 0.1 | −3.1 ± 0.8 | 2.3 ± 0.1 | −3.4 ± 0.3 | 0.697 |
| EtCO2 | 40 ± 1 | 36 ± 2 | 38 ± 1 | 34 ± 2 | 0.556 |
| CBF max | 527 ± 51 | 50 ± 34 | 623 ± 24 | 35 ± 25 | 0.722 |
| CBF min | 187 ± 30 | −24 ± 17 | 206 ± 17 | −5 ± 8 | 0.328 |
| CPP calc | 67 ± 5 | 32 ± 5 | 69 ± 2 | 19 ± 5 | 0.074 |
| CerPP calc | 62 ± 5 | 51 ± 8 | 65 ± 2 | 20 ± 5 | 0.006* |

Figure 20:
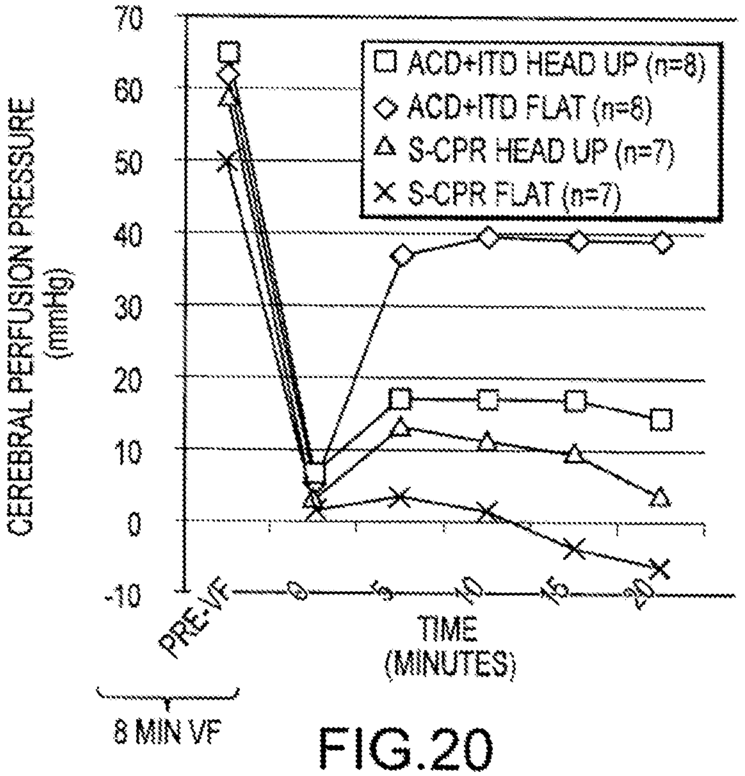
FIG. 20 is a graph depicting cerebral perfusion pressures over time with differential head and heart elevation during C-CPR and ACD+ITD CPR according to embodiments.

Both HUP and SUP cerebral perfusion pressures were similar at baseline. Eight pigs were randomized to each group. For the primary outcome, after 22 minutes of ACD+ITD CPR, CerPP in the HUP group was significantly higher than the SUP group (51±8 mmHg versus 20±5 mmHg, p=0.006). The elevation of cerebral perfusion pressure was constant over time with ACD+ITD plus differential head and thorax elevation. This is shown in FIG. 20. These findings demonstrate the synergy of combination optimal circulatory support during CPR with differential elevation of the heart and brain.

In pigs treated with ACD+ITD, the systolic blood pressure was significantly higher after 20 minutes of CPR in the HUP position compared with controls and the decompression phase right atrial pressures were significantly lower in the HUP pigs. Further, the ICP was significantly reduced during ACD+ITD CPR with elevation of the head and shoulders compared with the supine controls.

Coronary perfusion pressure was 32±5 mmHg in the HUP group and 19±5 mmHg in the SUP group at 20 minutes (p=0.074) (Table 1B). Both groups had a similar ROSC rate; 6/8 swine could be resuscitated in both groups.

Time to first gasp was 280±27 seconds in the HUT group and 333±33 seconds in the SUP group (p=0.237).

The primary objective of this study was to determine if elevation of the head by 15 cm and the heart by 4 cm during CPR would increase the calculated cerebral and coronary perfusion pressure after a prolonged resuscitation effort. The hypothesis stated that elevation of the head would enhance venous blood drainage back to the heart and thereby reduce the resistance to forward arterial blood flow and differentially reduce the venous pressure head the bombards the brain with each compression, as the venous vasculature is significantly more compliance than the arterial vasculature. The hypothesis further included that a slight elevation of the thorax would result in higher systolic blood pressures and higher coronary perfusion pressures based upon the following physiological concepts. A small elevation of the thorax, in the study 4 cm, was hypothesized to create a small but importance gradient across the pulmonary vascular beds, with less congestion in the more cranial lungs fields since elevation of the thorax would cause more blood to pool in the lower lung fields. This would allow for better gas exchange in the upper lung fields and lower pulmonary vascular resistance in the congested upper lung fields, allowing more blood to flow from the right heart through the lungs to the left ventricle when compared to CPR in the flat or supine position. In contrast to a previous study with the whole body head up tilt, where there was a concern about a net decrease in central blood volume over time in greater pooling of venous blood over time in the abdomen and lower extremities, it was hypothesized that the small 4 cm elevation of the thorax with greater elevation of the head would provide a way to increase coronary pressure pressures (by lower right atrial pressure) and greater cerebral perfusion pressure (by lowering ICP) while preserving central blood volume and thus mean arterial pressure.

It has been previously reported that whole body head tilt up at 30° during CPR significantly improves cerebral perfusion pressure, coronary perfusion pressure, and brain blood flow as compared to the supine, or 0° position or the feet up and head down position after a relatively short duration of 5 minutes of CPR. Over time these effects were observed to decrease, and we hypothesized diminished effect over time was secondary to pooling of blood in the abdomen and lower extremities. The new results demonstrate that after a total time of 22 minutes of CPR, the absolute ICP values and the calculated CerPP were significantly higher in the head and shoulders up position versus the supine position for both automated C-CPR and ACD+ITD groups. The absolute HUP effect was modest in the C-CPR group, unlikely to be clinically significant, and none of the animals treated with C-CPR could be resuscitated. By contrast, differential elevation of the head by 15 cm and the thorax at the level of the heart by 4 cm in the ACD+ITD group resulted in a nearly 3-fold higher increase in the calculated CerPP and a 50% increase in the calculated coronary perfusion pressure after 22 minutes of continuous CPR. The new finding of increased coronary and CerPP in the HUP position during a prolonged ACD+ITD CPR effort is clinically important, since the average duration of CPR during pre-hospital resuscitation is often greater than 20 minutes and average time from collapse to starting CPR is often >7 minutes.

Other study endpoints included ROSC and time to first gasp as an indicator of blood flow to the brain stem. No pigs could be resuscitated after 22 minutes in the C-CPR group. ROSC rates were similar in Group B, with 6/8 having ROSC in both HUP and SUP groups.

From a physiological perspective, these findings are similar to those in the first whole body head up tilt CPR study. While ICP decreases with the HUP position, it is critical to maintain enough of an arterial pressure head to pump blood upwards to the elevated brain during HUP CPR. In a previous HUP study, removal of the ITD from the circuit resulted in an immediate decrease in systolic blood pressure. In the current study, the arterial pressures were lower in pigs treated with C-CPR versus ACD+ITD, both in the SUP and HUP positions. It is likely that the lack of ROSC in the pigs treated with C-CPR is a reflection of the limitations of conventional CPR where coronary and cerebral perfusion is far less than normal. As such, the absolute ROSC rates in the current study are similar to previous animal studies with ACD+ITD CPR and C-CPR.

Gasping during CPR is positive prognostic indicator in humans. While time to time to first gasp within Groups A and B was not significant, the time to first gasp was the shortest in the ACD+ITD HUP group of all groups. All 16 animals treated with ACD+ITD group gasped during CPR, whereas only 5/16 pigs gasped in the C-CPR group during CPR (3 HUP, 2 SUP).

Differential elevation of the head and thorax during C-CPR and ACD+ITD CPR increased cerebral and coronary perfusion pressures. This effect was constant over a prolonged period of time. The CerPP in the pigs treated with ACD+ITD CPR and the HUP position was nearly 50 mmHg, strikingly higher than the ACD+ITD SUP controls. In addition, the coronary perfusion pressure increased by about 50%, to levels known to be associated with consistently higher survival rates. By contrast, the modest elevation in CerPP in the C-CPR treated animals is likely clinically insignificant, as no pig treated with C-CPR could be resuscitated after 22 minutes of CPR. These observations provide strong support of the benefit of the combination of ACD+ITD CPR with differential elevation of the head and thorax.

Figure 21:
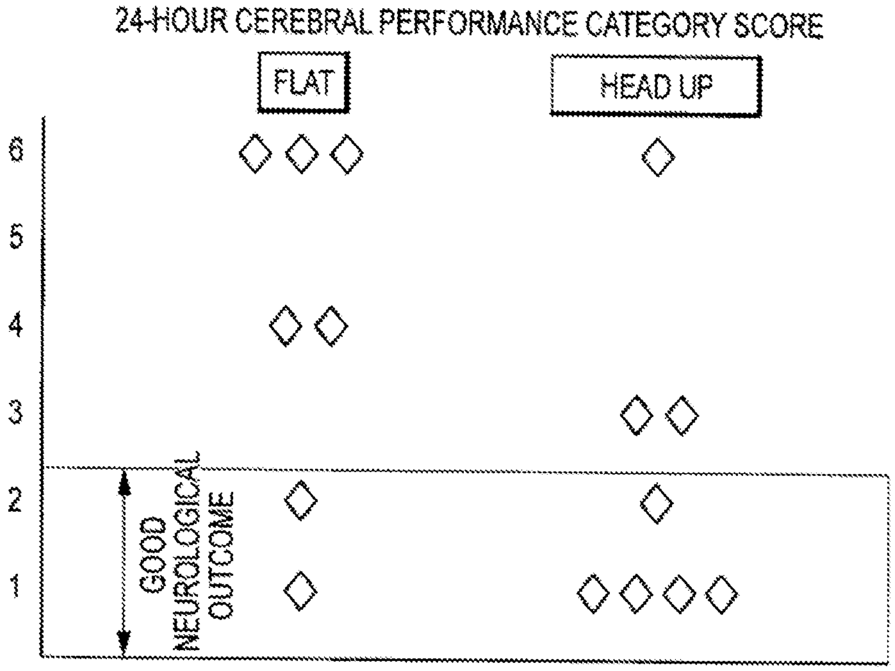
FIG. 21 is a chart depicting 24 hour porcine survival data from head and thorax up CPR vs. flat or supine CPR according to embodiments.

Additional data, as shown in FIG. 21, relates to 24 hour survival of pigs within a trial. A majority of pigs (5/7) who had flat or supine CPR administered had poor neurological outcomes. Notably, two of the pigs had very bad brain function and three of the pigs were dead. In contrast, a majority of pigs (5/8) receiving head and thorax up CPR had favorable neurological outcomes, with four pigs being normal and another pig suffering only minor brain damage. In the head and thorax up group, only a single pig was dead and two others had moderate brain damage. Thus, there was a much greater change that a pig survived with good brain function if head and thorax up CPR was administered rather than supine CPR.

To show head up CPR as described in the multiple embodiments in this application, a human cadaver model was used. The body was donated for science. The cadaver was less than 36 hours old and had never been embalmed or frozen. It was perfused with a saline with a clot disperser solution that breaks up blood clots so that when the head up CPR technology was evaluated there were no blood clots or blood in the blood vessels.

Figure 22:
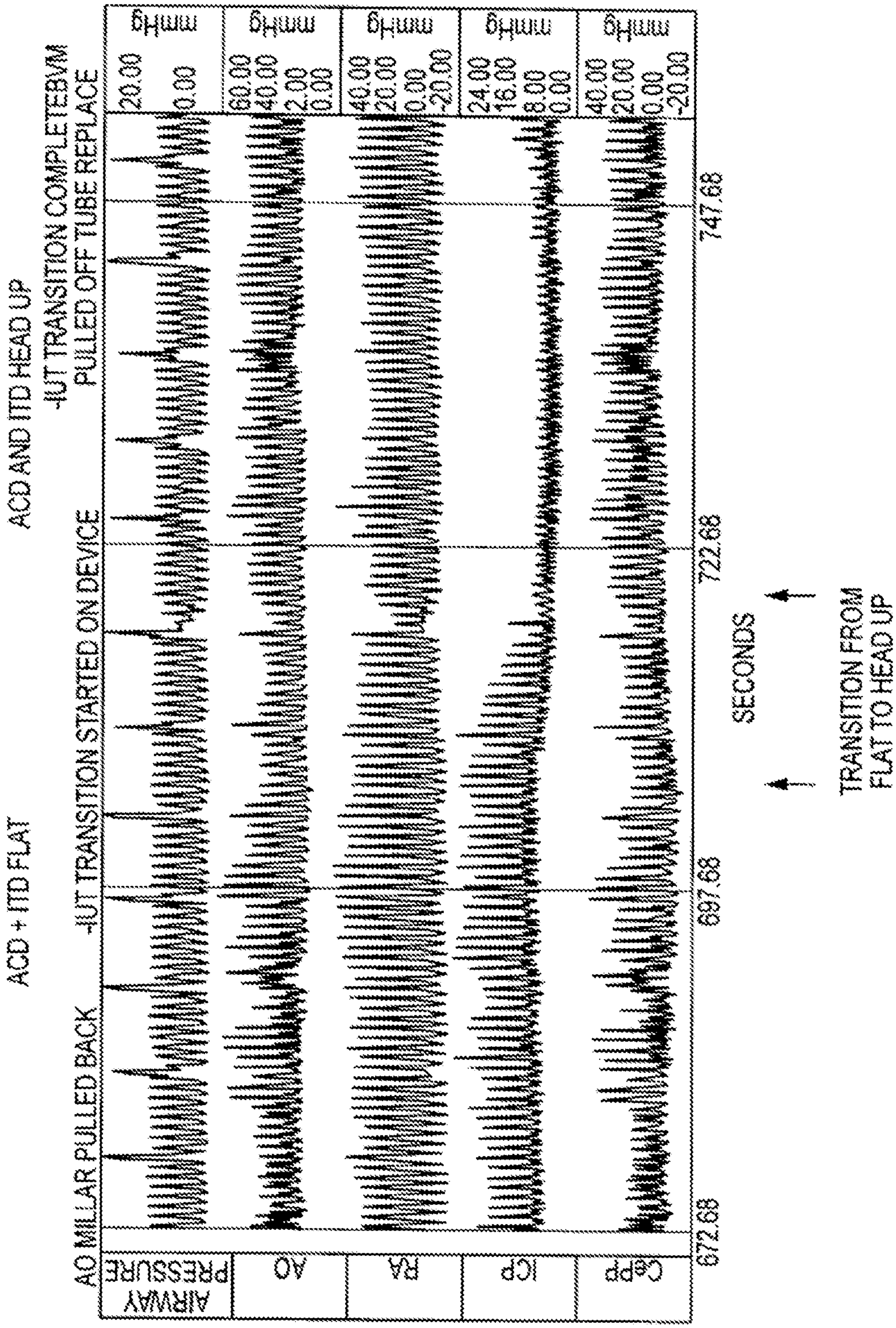
FIG. 22 is a chart depicting pressures measured during ACD+ITD CPR in a flat position and in a head up position according to embodiments.

Right atrial, aortic, and intracranial pressure transducers were inserted into the body into the right atria, aorta, and the brain through an intracranial bolt. These high fidelity transducers where then connected to a computer acquisition system (Biopac). CPR was performed with a ACD+ITD CPR in the flat position and then with the head elevated with the device shown in FIGS. 16A-D. The aortic pressure, intracranial pressure and the calculated cerebral perfusion pressure with CPR flat and with the elevation of the head as shown in FIG. 22. With elevation of the head cerebral perfusion pressures increased as shown in FIG. 21. The abbreviations are as follows: AO=aortic pressure, RA=right atrial pressure, ICP=intracranial pressure, CePP=cerebral perfusion pressure.

Figure 23:
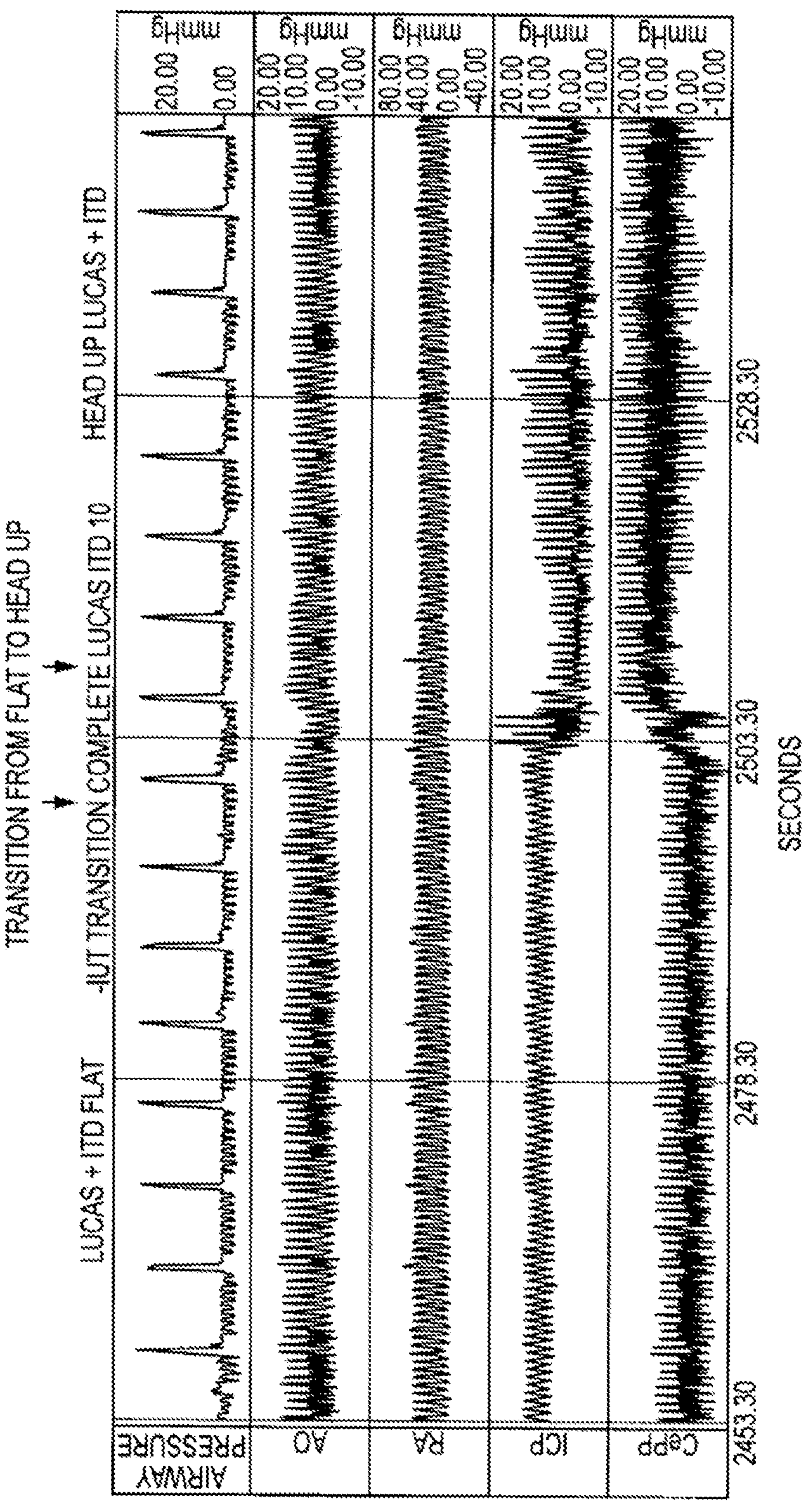
FIG. 23 is a chart depicting pressures measured during CPR with a Lucas device plus ITD in a flat position and in a head up position according to embodiments.

Then, the Lucas device plus ITD was applied to the cadaver and CPR was performed with the cadaver flat and with head up with a device similar to the device shown in FIGS. 16A-D. With elevation of the head cerebral perfusion pressures increased as shown in FIG. 23.

Specific details are given in the description to provide a thorough understanding of example configurations (including implementations). However, configurations may be practiced without these specific details. For example, well-known processes, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for performing cardiopulmonary resuscitation (CPR), comprising:

positioning an individual onto a support structure configured to elevate a head and a heart of the individual above a lower body of the individual;

performing chest compressions on the individual while the head and the heart of the individual are at a first elevation position for a first period of time;

elevating, using the support structure, the head and the heart to a second elevation position that is higher than the first elevation position, wherein in the second elevation position the head of the individual is between about 7 cm and about 27 cm higher than the heart of the individual; and performing a type of CPR and a type of intrathoracic pressure regulation while the head and the heart are elevated by the support structure to the second elevation position for a second period of time.

2. The method for performing cardiopulmonary resuscitation (CPR) of claim 1, wherein:

the heart and the head are elevated at a same angle relative to a substantially horizontal plane.

3. The method for performing cardiopulmonary resuscitation (CPR) of claim 1, wherein:

the type of CPR being performed comprises repeatedly compressing the chest of the individual, whereby elevation of the thorax and elevation of the head to a greater height than the thorax assists to 1) lower intracranial pressure and increase cerebral perfusion pressure during the performance of CPR and 2) increase coronary perfusion pressure during the performance of CPR.

4. The method for performing cardiopulmonary resuscitation (CPR) of claim 1, wherein:

the heart is elevated to a first angle relative to a substantially horizontal plane and the head is elevated to a second angle relative to the substantially horizontal plane, the second angle being greater than the first angle.

5. The method for performing cardiopulmonary resuscitation (CPR) of claim 4, wherein:

the first angle is between about 5 degrees and 15 degrees relative to a substantially horizontal plane and the second angle is between about 15 degrees and 45 degrees relative to the substantially horizontal plane.

6. The method for performing cardiopulmonary resuscitation (CPR) of claim 1, wherein:

in the second elevation position, the heart is between about 3 cm and 8 cm above a substantially horizontal plane; and in the second elevation position, the head is between about 10 cm and 30 cm above the substantially horizontal plane.

7. The method for performing cardiopulmonary resuscitation (CPR) of claim 1, further comprising:

coupling one or both of a device for regulating intrathoracic pressure or a CPR assist device to a structure supporting configured to support the head and the heart.

8. The method for performing cardiopulmonary resuscitation (CPR) of claim 1, wherein:

performing the type of CPR comprises performing chest compressions on the individual using a CPR assist device while maintaining the chest compressions at a substantially orthogonal angle relative to the individual's sternum.

9. The method for performing cardiopulmonary resuscitation (CPR) of claim 1, wherein:

in the first elevation position, the individual is in a flat, supine position.

10. The method for performing cardiopulmonary resuscitation (CPR) of claim 1, wherein:

performing chest compressions on the individual while the head and the heart of the individual are at a first elevation position occurs prior to positioning the individual onto the support structure.

11. The method for performing cardiopulmonary resuscitation (CPR) of claim 1, wherein:

performing chest compressions on the individual while the head and the heart of the individual are at a first elevation position occurs after positioning the individual onto the support structure.

12. The method for performing cardiopulmonary resuscitation (CPR) of claim 1 wherein:

the type of intrathoracic pressure regulation comprises using at least one device selected from the group consisting of an impedance threshold device, a suction cup-based compression active decompression device, a load-distributing thoracic circumference band or bladder device, and an intrathoracic pressure regulator that generates negative intrathoracic pressure after a positive pressure breath is delivered.

13. A method for performing cardiopulmonary resuscitation (CPR), comprising:

performing chest compressions on an individual while a head and a heart of the individual are at a first elevation position for a period of time;

elevating, using a support structure, the head and the heart of the individual to a second elevation position that is higher than the first elevation position, wherein in the second elevation position the head of the individual is between about 7 cm and about 27 cm higher than the heart of the individual;

performing CPR for a second period of time while the head and the heart are elevated to the second elevation position by repeatedly compressing the chest, whereby elevation of the heart and elevation of the head to a greater height than the thorax assists to 1) lower intracranial pressure and increase cerebral perfusion pressure during the performance of CPR and 2) lower right atrial pressure and increase coronary perfusion pressure during the performance of CPR; and regulating the intrathoracic pressure of the individual while performing CPR.

14. The method for performing cardiopulmonary resuscitation (CPR) of claim 13, wherein:

in the second elevation position, the heart is elevated between about 3 cm and 8 cm relative to a substantially horizontal plane in which a lower body of the individual is positioned, and the head is elevated between about 10 cm and 30 cm relative to the substantially horizontal plane.

15. The method for performing cardiopulmonary resuscitation (CPR) of claim 13, wherein:

a vertical distance between the head and the heart in the second elevation position is determined based on a type of CPR performed and a type of intrathoracic pressure regulation.

16. The method for performing cardiopulmonary resuscitation (CPR) of claim 13, wherein:

performing CPR comprises performing one or more of standard conventional CPR, stutter CPR, an active compression decompression CPR; a thoracic band with phased CPR; an automated CPR using a device that performs CPR according to an algorithm.

17. The method for performing cardiopulmonary resuscitation (CPR) of claim 13, further comprising:

interfacing a chest compression device to the chest of the individual; and interfacing an impedance threshold device with the airway of the individual to create a negative pressure within the chest during a relaxation phase of CPR.

18. The method for performing cardiopulmonary resuscitation (CPR) of claim 13, wherein:

elevating the heart and elevating the head comprises adjusting of a surface of the support structure that supports one or both of the heart or the head.

19. The method for performing cardiopulmonary resuscitation (CPR) of claim 13, further comprising:

measuring one or more of blood pressure or carotid flow; and determining a vertical distance between the head and the heart in the second elevation position based on the one or more of blood pressure or carotid flow.

* * * * *